United States Patent
Thomson

(10) Patent No.: US 10,851,579 B2
(45) Date of Patent: Dec. 1, 2020

(54) COMPOSITE MOLDED SHELL WITH STIFFENING INNER CORE FOR INTERIOR TRIM MOLDING APPLICATIONS

(71) Applicant: William-MacRae and Company, Omaha, NE (US)

(72) Inventor: Colin MacRae Thomson, Issaquah, WA (US)

(73) Assignee: WILLIAM-MACRAE AND COMPANY, Omaha, NE (US)

( * ) Notice: Subject to any disclaimer, the term of this patent is extended or adjusted under 35 U.S.C. 154(b) by 0 days.

(21) Appl. No.: 16/267,683

(22) Filed: Feb. 5, 2019

(65) Prior Publication Data

US 2019/0242177 A1 Aug. 8, 2019

Related U.S. Application Data

(60) Provisional application No. 62/626,305, filed on Feb. 5, 2018.

(51) Int. Cl.
*E06B 1/32* (2006.01)
*E06B 1/52* (2006.01)
(Continued)

(52) U.S. Cl.
CPC ............ *E06B 1/32* (2013.01); *E06B 1/52* (2013.01); *B32B 7/12* (2013.01); *B32B 21/042* (2013.01);
(Continued)

(58) Field of Classification Search
CPC ..... E06B 1/08; E06B 1/32; E06B 1/34; E06B 1/30; E06B 1/52
(Continued)

(56) References Cited

U.S. PATENT DOCUMENTS 2,582,468 A * 1/1952 Sylvan ............... E06B 1/32
  52/211
3,130,455 A * 4/1964 Borlenghi ........... E06B 1/32
  49/504
(Continued)

FOREIGN PATENT DOCUMENTS

AU 2011200910 A1 4/2011
CA 2570866 A1 6/2005
(Continued)

OTHER PUBLICATIONS

Notification of Transmittal of the International Search Report and the Written Opinion of the International Searching Authority, dated May 20, 2019, PCT/US19/16595.
(Continued)

*Primary Examiner* — Robert Canfield
(74) *Attorney, Agent, or Firm* — Ryan T. Grace; Advent, LLP

(57) ABSTRACT

A composite trim molding assembly includes a composite outer shell having at least one pressed or molded surface feature and a core disposed within the composite outer shell for at least one of strengthening or stiffening the outer shell. The composite trim molding assembly can be configured as a door jamb. For example, the composite outer shell can include a flat jamb, and the at least one pressed or molded surface feature can include a stop. The core can include a protrusion into a cavity formed by the stop. The cavity formed by the stop may also be hollow. The composite outer shell can be molded from a slurry and/or pressed from a flat composite panel. The at least one pressed or molded surface feature can include a surface texture (e.g., a wood grain pattern). The core can include segments fastened together, particle board, and/or fiberboard.

14 Claims, 25 Drawing Sheets

(51) Int. Cl.
　　　B32B 21/14　　　(2006.01)
　　　B32B 7/12　　　(2006.01)
　　　B32B 21/08　　　(2006.01)
　　　B32B 21/04　　　(2006.01)
(52) U.S. Cl.
　　　CPC ............... B32B 21/08 (2013.01); B32B 21/14
　　　　　　　　　　(2013.01); B32B 2419/00 (2013.01)
(58) Field of Classification Search
　　　USPC .......... 52/211, 215, 656.2, 717.01, 834, 836,
　　　　　　　　　　　　　　　　　　　　　　　52/847
　　　See application file for complete search history.

(56)　　　　　　　　References Cited

U.S. PATENT DOCUMENTS

| | | | | |
|---|---|---|---|---|
| 3,345,780 A * | 10/1967 | McGhee | ............... | E06B 1/30 49/504 |
| 3,591,985 A * | 7/1971 | Coppins | ............... | E06B 1/34 49/504 |
| 3,757,473 A * | 9/1973 | Mundy | ............... | E06B 1/10 49/380 |
| 3,888,810 A * | 6/1975 | Shinomura | ......... | C08L 2666/26 524/13 |
| 4,005,558 A * | 2/1977 | Barrison | ............... | E06B 1/12 52/213 |
| 4,566,234 A | 1/1986 | Held | | |
| 4,610,900 A * | 9/1986 | Nishibori | ............... | B44C 3/04 156/209 |
| 4,698,944 A * | 10/1987 | Wilkins, Jr. | ............ | E06B 1/603 49/504 |
| 4,885,882 A * | 12/1989 | Forshee | ............... | B63B 3/48 52/177 |
| 4,907,387 A * | 3/1990 | Turnbull | ........... | E04F 15/02183 52/177 |
| 5,115,597 A * | 5/1992 | Tillery | ............... | E06B 1/526 49/504 |
| 5,203,130 A * | 4/1993 | Freelove | ............... | E06B 1/30 52/211 |
| 5,347,780 A * | 9/1994 | Richards | ............... | B28B 1/525 52/204.1 |
| 5,406,768 A * | 4/1995 | Giuseppe | ............... | B27N 3/28 52/843 |
| 5,441,801 A * | 8/1995 | Deaner | ............... | B27N 3/28 428/326 |
| 5,546,715 A * | 8/1996 | Edstrom | ............... | E06B 1/08 49/504 |
| 5,585,155 A * | 12/1996 | Heikkila | ............... | B29C 70/08 428/34.1 |
| 5,661,943 A * | 9/1997 | Hagel | ............... | E06B 1/06 52/170 |
| 5,669,192 A | 9/1997 | Opdyke et al. | | |
| 5,770,267 A | 6/1998 | Bullock, Jr. | | |
| 5,836,118 A * | 11/1998 | Thornton | ............... | E06B 1/045 52/204.1 |
| 5,900,304 A | 5/1999 | Owens | | |
| 5,913,784 A * | 6/1999 | Hite | ............... | E01C 5/22 52/177 |
| 5,987,843 A | 11/1999 | Canfield | | |
| 6,122,882 A | 9/2000 | Hagel | | |
| 6,216,395 B1 * | 4/2001 | Kelly | ............... | E04G 21/30 49/467 |
| 6,260,328 B1 * | 7/2001 | Fowler | ............... | E04F 11/1842 52/834 |
| 6,265,037 B1 * | 7/2001 | Godavarti | ............... | B29C 48/12 428/34 |
| 6,269,591 B1 * | 8/2001 | Kelly | ............... | E04G 21/30 49/482.1 |
| 6,295,779 B1 * | 10/2001 | Canfield | ............... | E06B 1/32 49/504 |
| 6,347,494 B1 * | 2/2002 | Noirot | ............... | E04C 2/246 52/181 |
| 6,357,197 B1 * | 3/2002 | Serino | ............... | E06B 3/205 156/244.12 |
| 6,368,544 B1 | 4/2002 | Owens | | |
| 6,451,235 B1 | 9/2002 | Owens | | |
| 6,453,631 B1 * | 9/2002 | Headrick | ............... | B29C 44/12 49/504 |
| 6,481,170 B1 * | 11/2002 | Savenok | ............... | E04B 1/7629 264/45.1 |
| 6,584,743 B2 | 7/2003 | Paxton et al. | | |
| 6,893,594 B2 * | 5/2005 | Chen | ............... | B27N 3/28 264/211.23 |
| 7,147,907 B1 * | 12/2006 | Hiltz | ............... | B32B 3/04 428/122 |
| 7,943,070 B1 | 5/2011 | Clark et al. | | |
| 8,371,079 B2 * | 2/2013 | An | ............... | E06B 1/32 52/204.1 |
| 8,499,509 B2 * | 8/2013 | Sibbett | ............... | E06B 1/34 49/504 |
| 8,852,485 B2 | 10/2014 | Fujii | | |
| 9,056,444 B1 | 6/2015 | Moeller | | |
| 9,127,499 B2 * | 9/2015 | Lemons | ............... | E06B 1/32 |
| 9,803,413 B2 * | 10/2017 | MacDonald | ............... | E06B 1/34 |
| 10,208,485 B2 * | 2/2019 | Serino | ............... | E04C 2/041 |
| 2002/0007898 A1 | 1/2002 | Spica | | |
| 2004/0241476 A1 * | 12/2004 | Friedman | ............... | B32B 27/12 428/515 |
| 2005/0178071 A1 * | 8/2005 | Wood | ............... | E04F 15/02 52/3 |
| 2005/0193653 A1 | 9/2005 | Cornell | | |
| 2005/0257455 A1 * | 11/2005 | Fagan | ............... | E06B 1/26 52/210 |
| 2006/0096191 A1 * | 5/2006 | Liu | ............... | E06B 1/06 52/204.1 |
| 2010/0251642 A1 * | 10/2010 | Erickson | ............... | E06B 1/34 52/204.1 |
| 2012/0167371 A1 | 7/2012 | Mateu Climent | | |
| 2013/0276391 A1 * | 10/2013 | Horneland | ............... | E06B 1/24 52/215 |
| 2019/0128048 A1 * | 5/2019 | MacDonald | ............... | E06B 1/30 |

FOREIGN PATENT DOCUMENTS

| | | | | |
|---|---|---|---|---|
| CN | 1993212 B | 7/2007 | | |
| CN | 202755579 U | 2/2013 | | |
| CN | 204238765 U | 4/2015 | | |
| EP | 2246500 A2 | 11/2010 | | |
| EP | 1789243 B1 | 3/2014 | | |
| ES | 2013426 A6 * | 5/1990 | | |
| GB | 990351 A | 4/1965 | | |
| GB | 1017100 A * | 1/1966 | ............ | E06B 3/825 |
| GB | 1272846 | 5/1972 | | |
| GB | 1386254 | 3/1975 | | |
| JP | 0392301 A * | 4/1991 | | |
| JP | 5355887 B2 | 11/2013 | | |
| KR | 101303973 B1 | 9/2013 | | |
| NZ | 552249 A | 8/2010 | | |
| WO | WO-8601557 A * | 3/1986 | | |
| WO | 9505519 | 2/1995 | | |
| WO | WO-9505519 A1 * | 2/1995 | ............ | E06B 1/34 |
| WO | 0004249 | 1/2000 | | |
| WO | 03022542 A1 | 3/2003 | | |

OTHER PUBLICATIONS http://surfaceandpanel.com/Features/Technology/Technology-Detail/lightweight-to-the-core#sthash.AkybRJ5p.NDA26StF.dpbs; web-site last visited on Jun. 11, 2019.
https://www.homedepot.ca/product/masonite-primed-mdf-pre-machined-double-door-frame/1000122135; eb-site last visited on Jun. 11, 2019.

\* cited by examiner

COMPOSITE MOLDED SHELL WITH STIFFENING INNER CORE FOR INTERIOR TRIM MOLDING APPLICATIONS

CROSS-REFERENCE TO RELATED APPLICATIONS

The present application claims the benefit under 35 U.S.C. § 119(e) of U.S. Provisional Application Ser. No. 62/626,305, filed Feb. 5, 2018, and titled "COMPOSITE MOLDED SHELL WITH STIFFENING INNER CORE FOR INTERIOR TRIM MOLDING APPLICATIONS," which is herein incorporated by reference in its entirety.

BACKGROUND

Interior woodwork for buildings, such as residential and commercial housing, includes trim moldings, such as casings used to trim the perimeter of windows, doors, and so forth. For example, a doorframe can include case molding in the form of two upright jambs. A door can be hung on one of the upright jambs. Base molding can be applied where a wall meets the floor of a structure.

DRAWINGS

The Detailed Description is described with reference to the accompanying figures. The use of the same reference numbers in different instances in the description and the figures may indicate similar or identical items.

DETAILED DESCRIPTION

Figure 1:
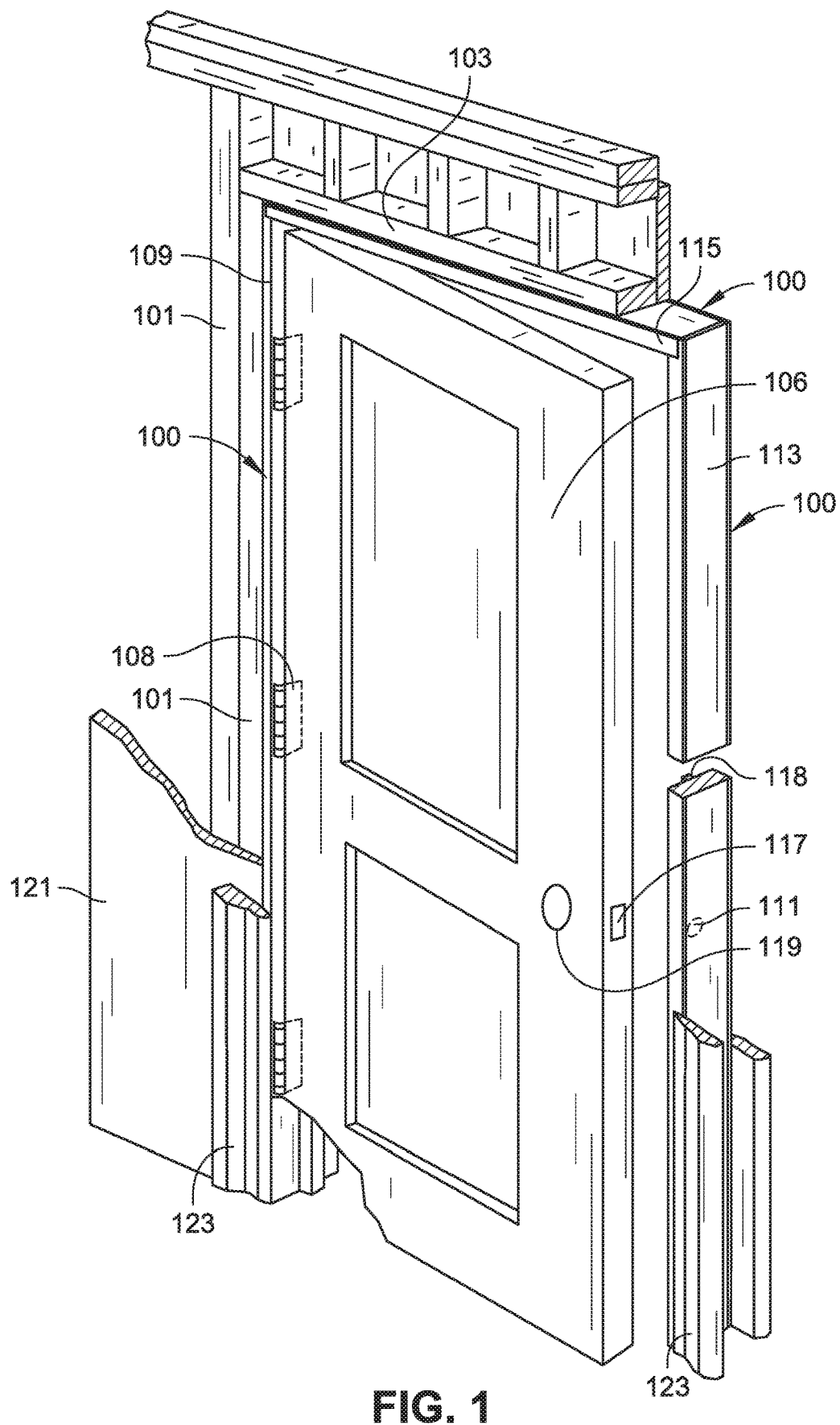
FIG. 1 is an isometric view illustrating interior door jamb assemblies configured as a door jamb set and installed in a rough opening in accordance with example embodiments of the present disclosure.
Figure 2:
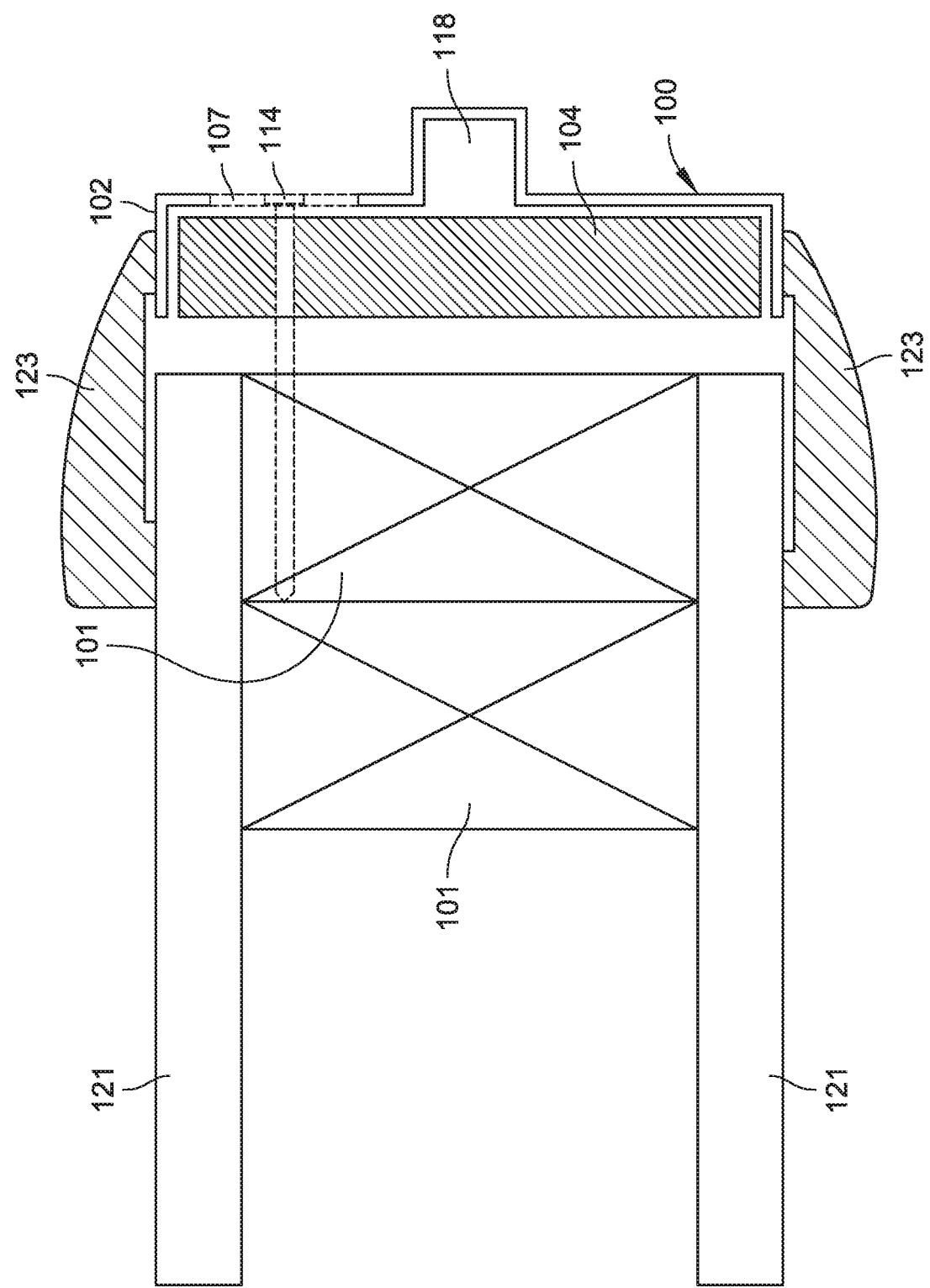
FIG. 2 is a partial cross-sectional top plan view of the door jamb set and rough opening illustrated in FIG. 1.
Figure 3:
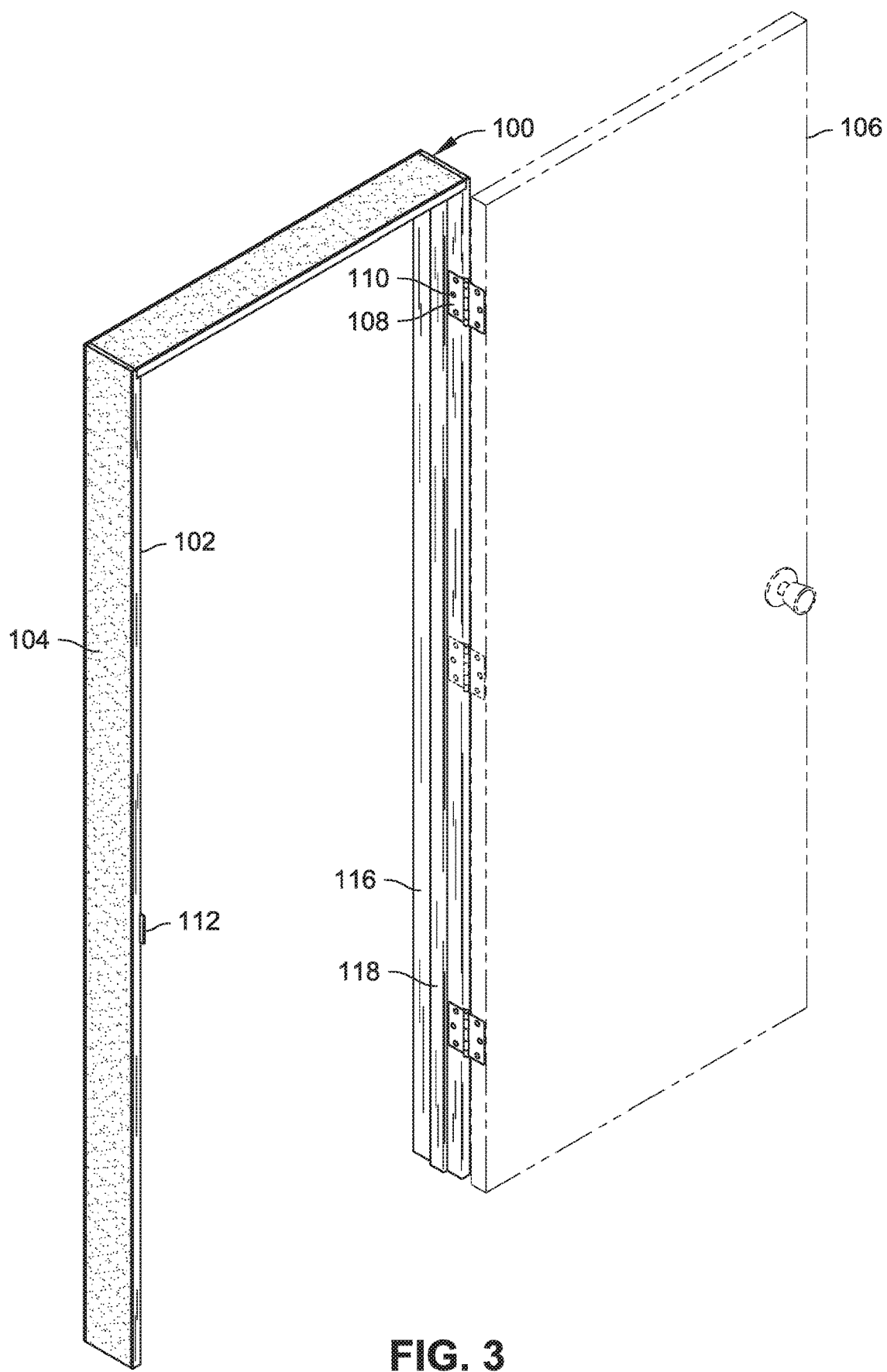
FIG. 3 is an isometric view illustrating interior door jamb assemblies configured as a door jamb set in accordance with example embodiments of the present disclosure.
Figure 4:
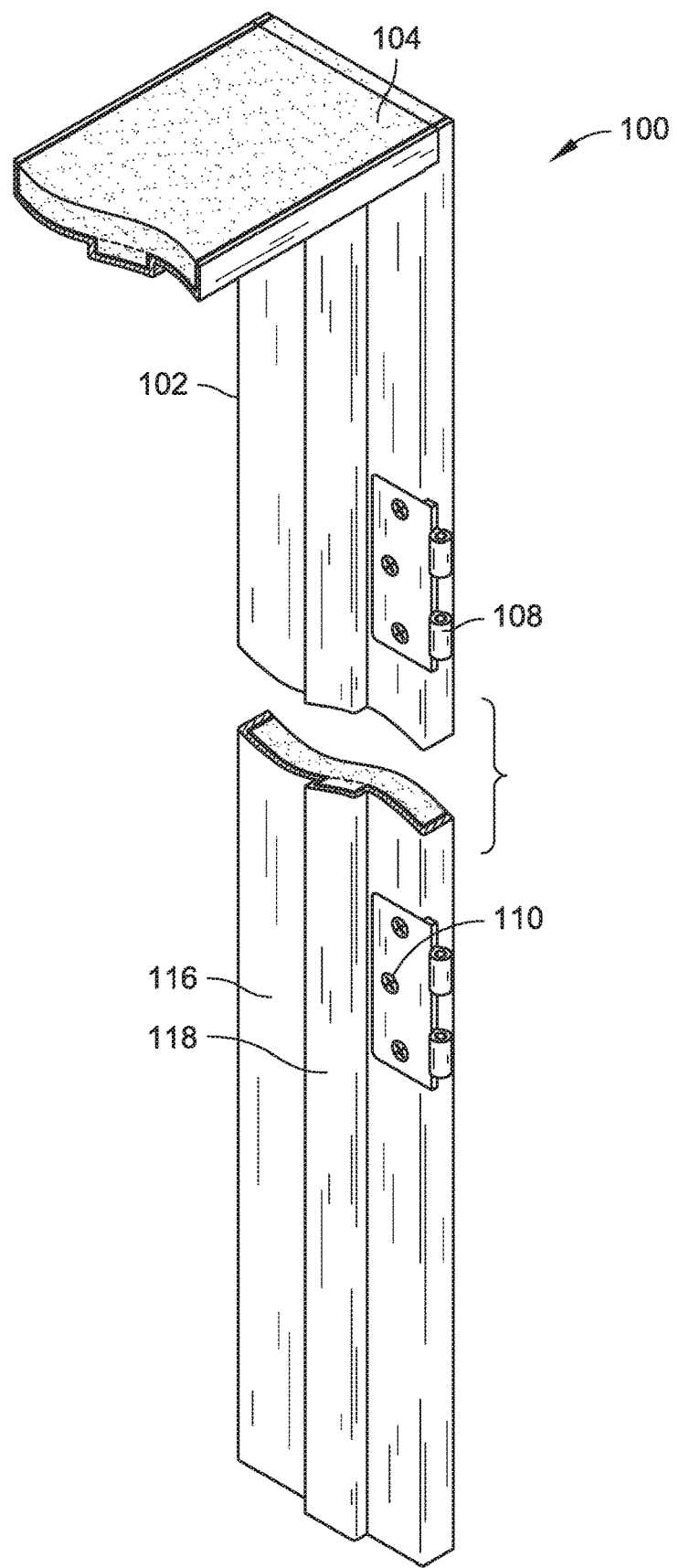
FIG. 4 is a partial isometric view illustrating interior door jamb assemblies and hinges for a door jamb set, such as the door jamb set illustrated in FIG. 3, in accordance with example embodiments of the present disclosure.
Figure 5:
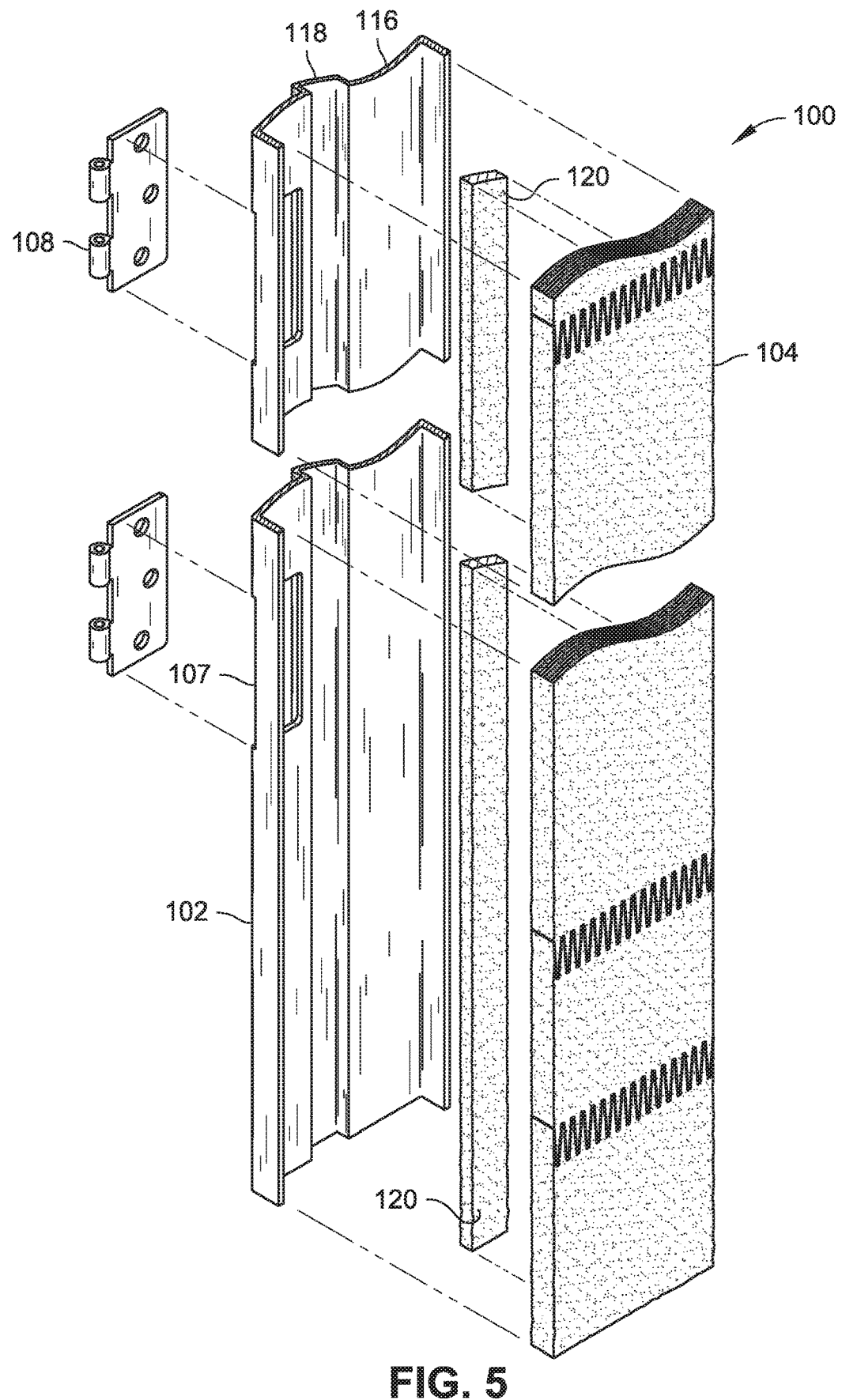
FIG. 5 is a partial exploded isometric view illustrating an interior door jamb assembly and hinges for a door jamb set, such as the door jamb set illustrated in FIG. 3, in accordance with example embodiments of the present disclosure.
Figure 6:
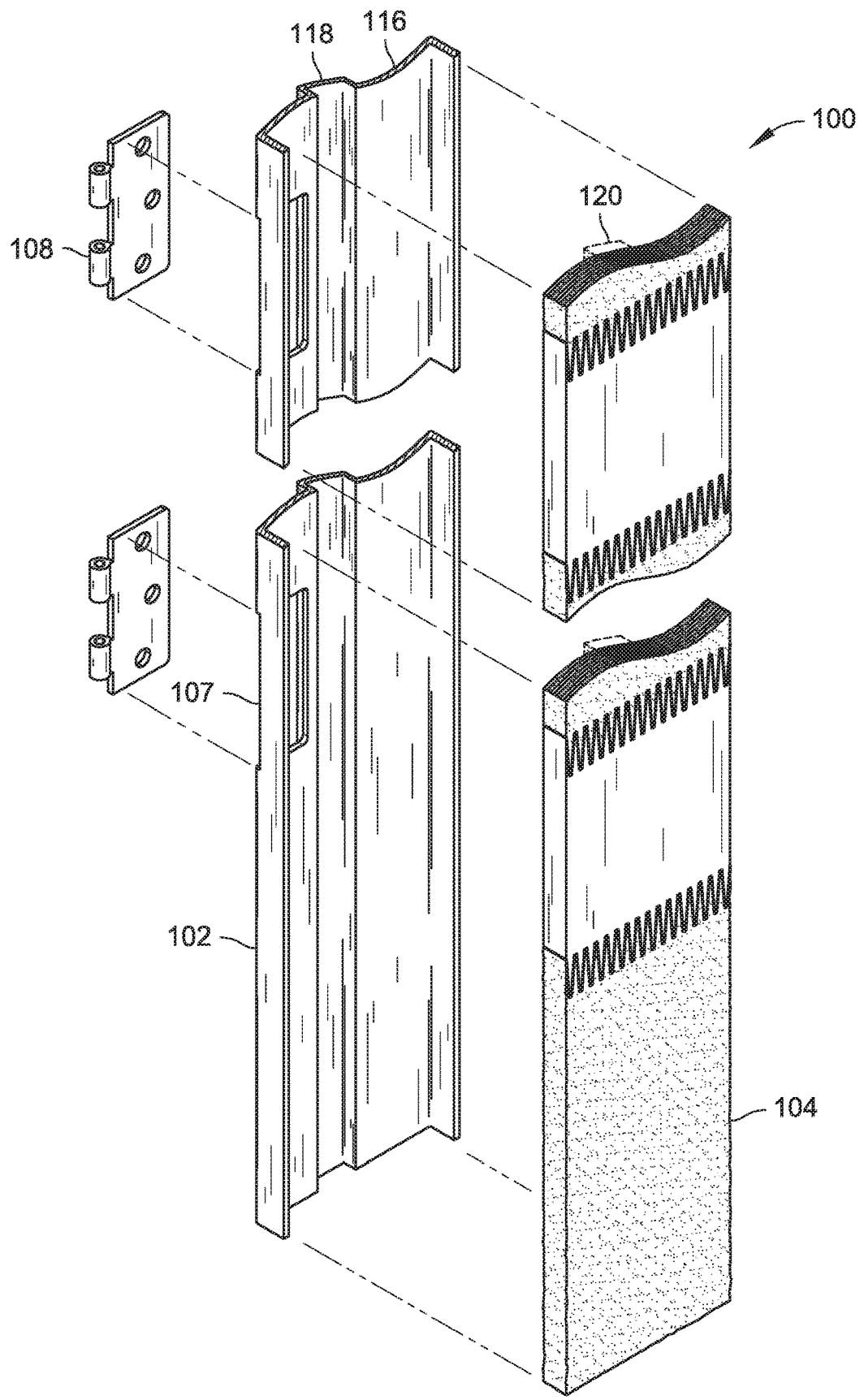
FIG. 6 is another partial exploded isometric view illustrating an interior door jamb assembly and hinges for a door jamb set, such as the door jamb set illustrated in FIG. 3, in accordance with example embodiments of the present disclosure.
Figure 7:
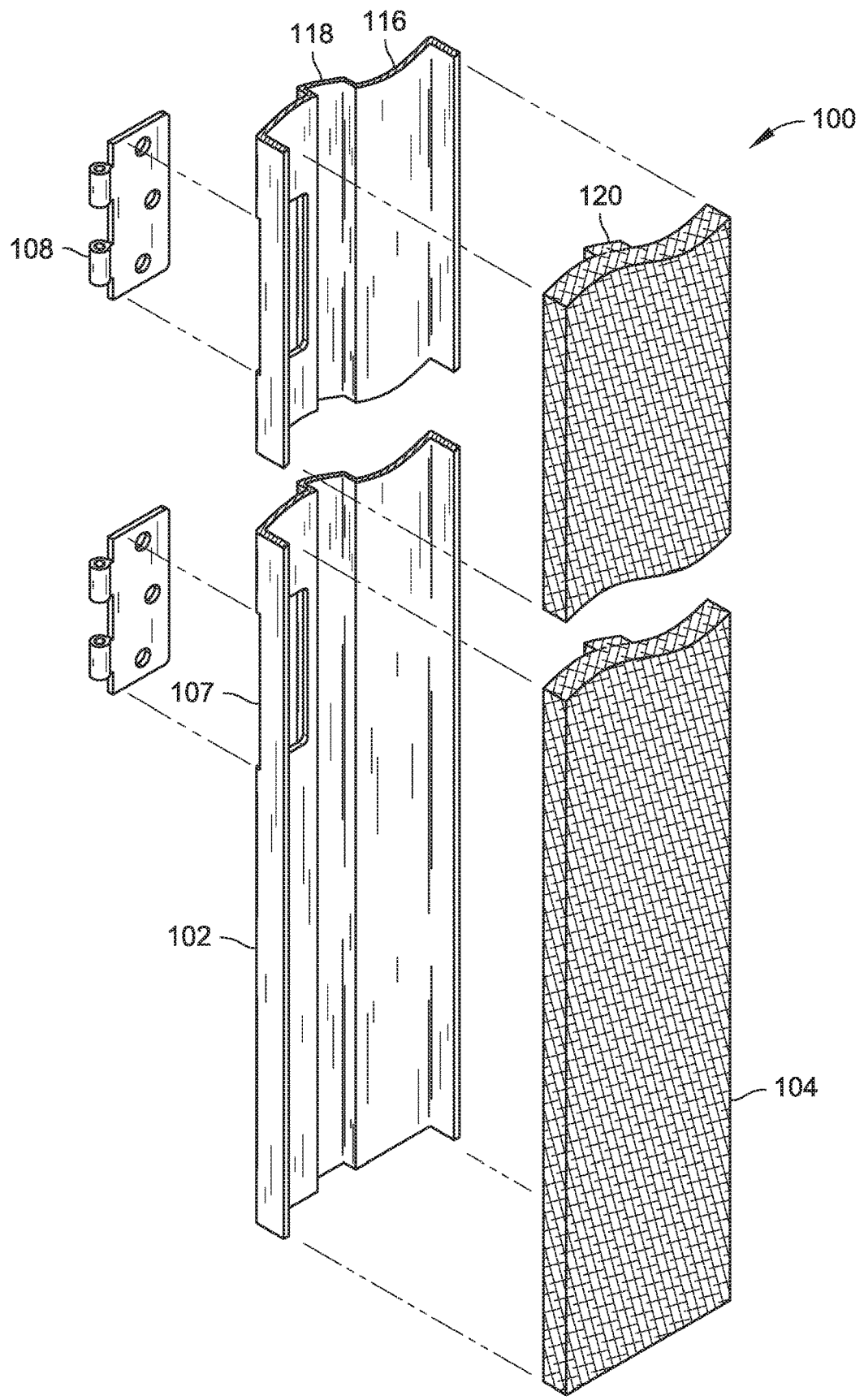
FIG. 7 is a further partial exploded isometric view illustrating an interior door jamb assembly and hinges for a door jamb set, such as the door jamb set illustrated in FIG. 3, in accordance with example embodiments of the present disclosure.
Figure 8:
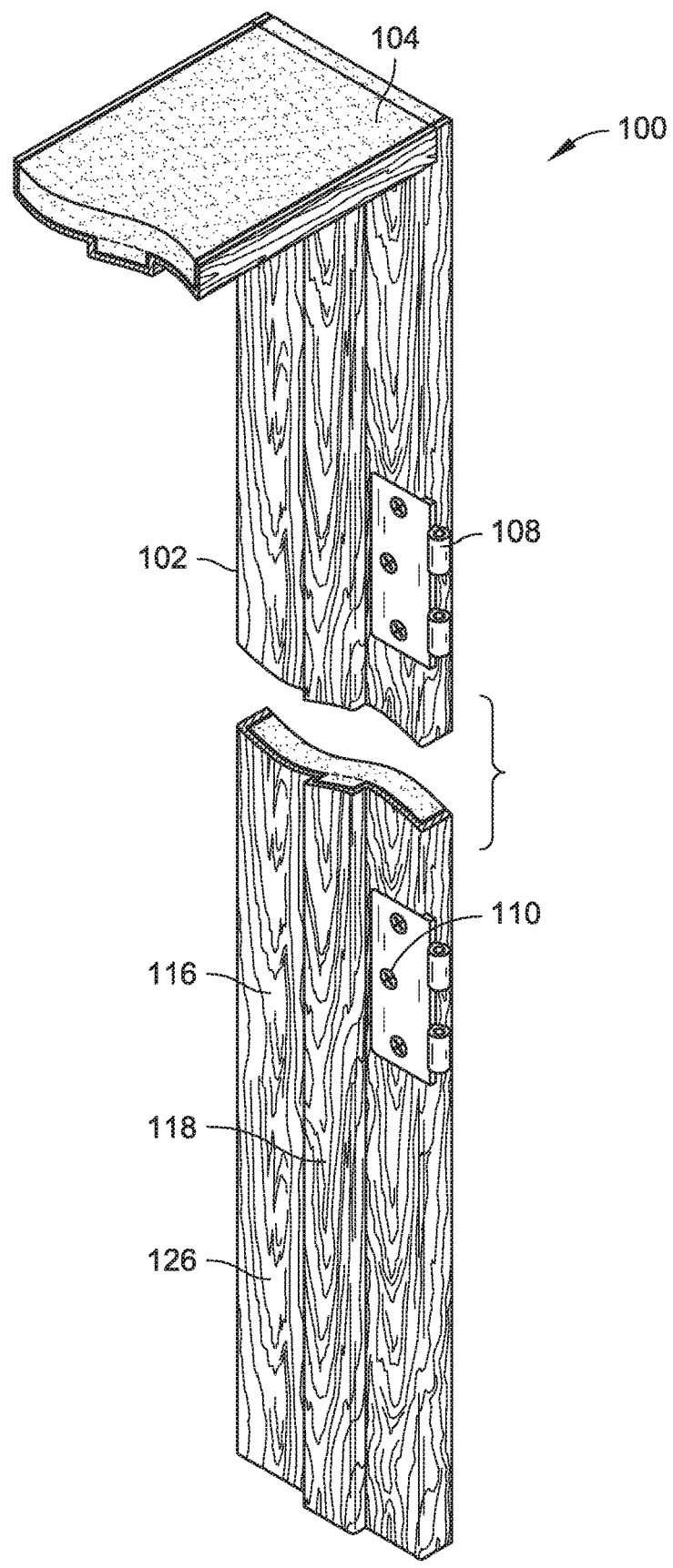
FIG. 8 is a partial isometric view illustrating interior door jamb assemblies and hinges for a door jamb set, such as the door jamb set illustrated in FIG. 3, in accordance with example embodiments of the present disclosure.
Figure 9:
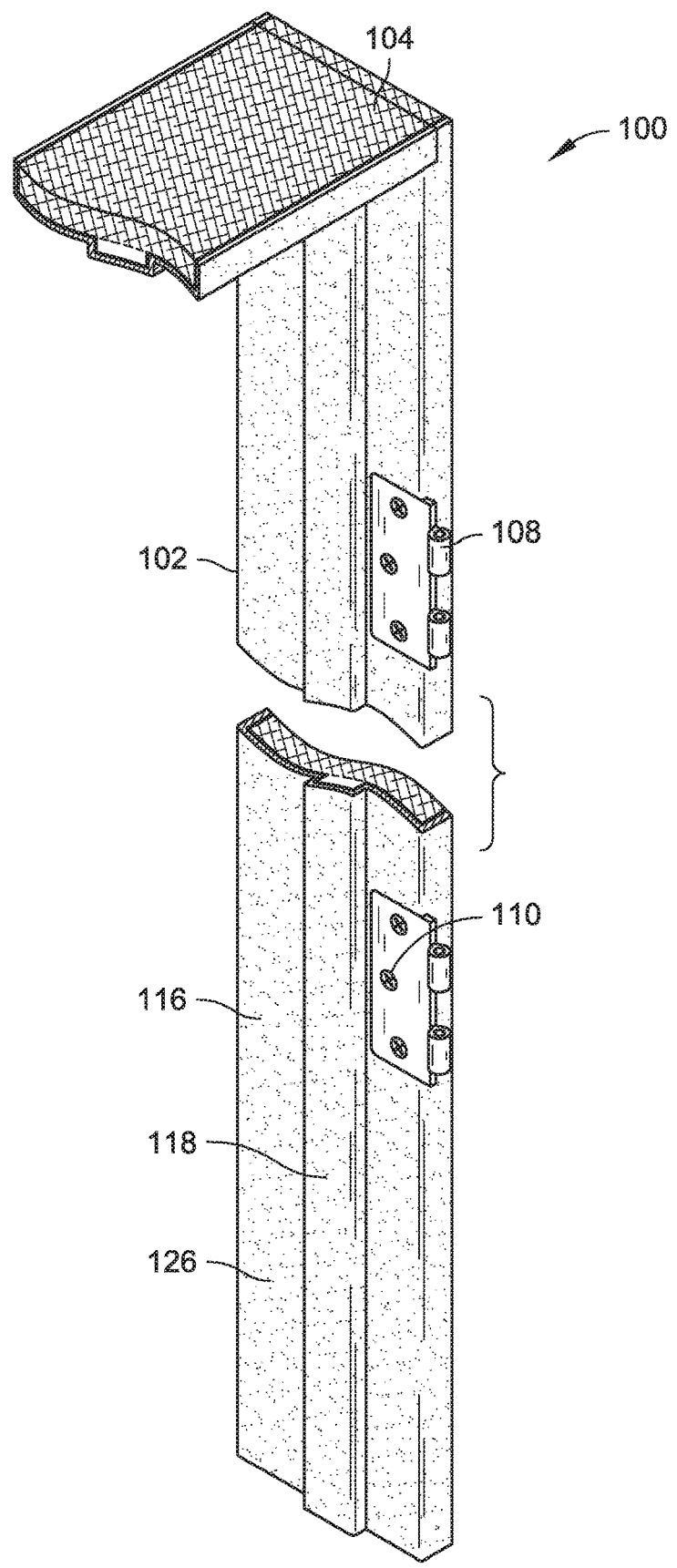
FIG. 9 is another partial isometric view illustrating interior door jamb assemblies and hinges for a door jamb set, such as the door jamb set illustrated in FIG. 3, in accordance with example embodiments of the present disclosure.
Figure 10:
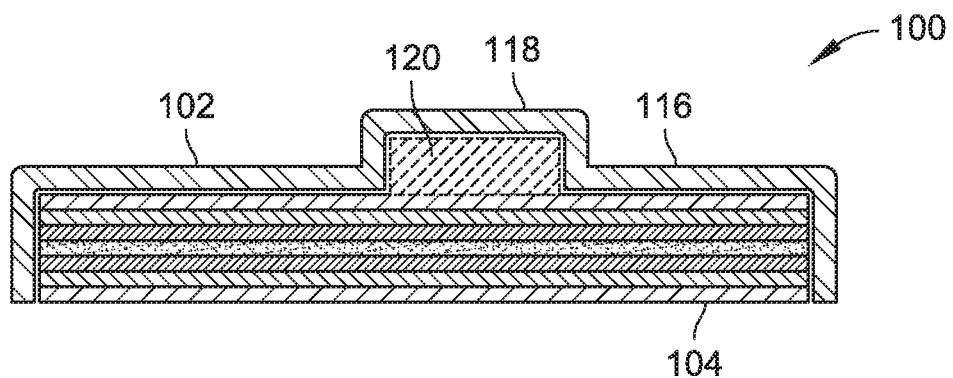
FIG. 10 is a cross-sectional end view illustrating an interior door jamb assembly for a door jamb set, such as the door jamb set illustrated in FIG. 3, in accordance with example embodiments of the present disclosure.
Figure 11:
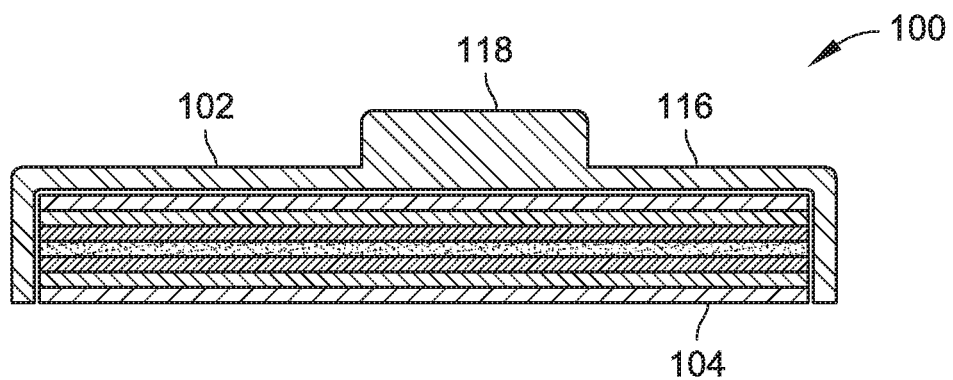
FIG. 11 is another cross-sectional end view illustrating an interior door jamb assembly for a door jamb set, such as the door jamb set illustrated in FIG. 3, in accordance with example embodiments of the present disclosure.

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. The following detailed description is, therefore, not to be taken in a limiting sense.

Interior millwork for residential and commercial housing are decorative, nonstructural components normally made of strips of wood and used to cover transition areas between surfaces. These components, called "mouldings" or "moldings," include casings/case moldings, base moldings, and crown moldings, and can be used to trim the perimeter of windows, doors, and locations where walls meet a floor or a ceiling. Vertical and horizontal millwork trim pieces that cover door openings are called door jambs. Vertical door jambs bear the weight of the door through applied hinges and latches. Two vertical jamb sides and a head jamb may be referred to as a door jamb set. A door jamb set hinged to a door may be referred to as a prehung door. The accuracy of the plumb and strength of a door jamb is important to the overall operational durability and security of a door. Today, millwork also encompasses items that are made using alternatives to wood, including synthetics, plastics, and wood-adhesive composites. Millwork may be painted or stained (e.g., after installation).

Referring generally to FIGS. 1 through 32, composite trim molding assemblies, such as door jamb assemblies 100 for a door jamb set are described. A door jamb assembly 100 can include an outer one-piece shell 102 covering a strengthening and stiffening core 104. The door jamb assemblies 100 can be used for interior doorway applications. For example, a door 106 can be attached to an interior door jamb assembly 100 by hinges 108 fastened to the door jamb assembly 100 by fasteners (e.g., screws 110) extending into the door jamb assembly 100. A door jamb assembly 100 can also include other hardware, such as a strike plate 112 and so forth. A door jamb assembly 100 can be fastened to the doorframe by fasteners (e.g., nails 114) extending through a side of the door jamb assembly 100 and into the framing studs (e.g., jack stud 101) and/or header 103 of the doorframe. For example, a doorframe may be formed by a king stud 101 and a jack stud 101 on one side of the doorframe (with additional framing studs mirrored on the other side of the doorframe) and a header 103 at the top of the doorframe. The side of the door jamb set formed by a door jamb assembly 100 that attaches the hinges 108 can include hinge cutouts 107 and forms a hinge jamb 109. In other embodiments, the door jamb assembly 100 does not necessarily include the hinge cutouts 107. For instance, cutouts may be added during installation of the door 106. The other side of the door jamb set formed by a door jamb assembly 100 that attaches the strike plate 112 can include a mortise 111 (e.g., for the strike plate 112) and forms a latch jamb 113. The top of the door jamb set formed by a door jamb assembly 100 forms a head jamb 115. The door can include a latch bolt bore 117 for a latch bolt to interface with the strike plate 112/mortise 111 and a lockset bore 119. After the door jamb set is anchored to the rough opening, finishes such as drywall 121 and casings 123 can be added to complete the installation.

The shell 102 can be formed of a composite material (e.g., engineered wood formed from wood dust (e.g., sawdust), shavings, fibers, fillers, etc.) and shaped into a flat jamb 116. In some embodiments, the shell 102 may also include one or more surface features, such as a stop 118. In embodiments of the disclosure, the shell 102 can be molded from slurry, pressed from a flat composite panel, and so forth. For example, in some embodiments, the shell 102 can be molded cellulosic fiberboard, which can be formed from a pre-consolidated mat. The pre-consolidated mat can be formed into consolidated medium-density fiberboard (MDF), hardboard, softboard, low-density fiberboard, and so forth. For instance, hardwood and/or softwood residuals can be broken down into fillers or fibers (e.g., using a defibrator or another pulping machine, grinding, explosion hydrolysis, etc.), and the resulting wood fillers or fibers can be formed into a loose mat along with a binding agent and/or resin and/or wax and compressed under high temperature and pressure to form a shell 102. In some embodiments, the pre-consolidated cellulosic mat may be planar. However, when molded to form the shell 102, various shaped molds may be used to form surface features (e.g., an embossed texture, such as a faux wood grain pattern surface texture 126) and/or contours (e.g., an interior extension or depression, such as stop 118). In some embodiments, a shell 102 may also have one or more smooth exterior surfaces. Further, the edges and/or sides of the door jamb assembly 100 may include various edge details, including, but not necessarily limited to: back beveled details (e.g., as described with reference to FIGS. 16 and 17), square details (e.g., as described with reference to FIGS. 12 and 13), trim guide details (e.g., as described with reference to FIGS. 18 through 21), and so on. For instance, edge details may be provided for resting and/or registering the casing 123. In some embodiments, the shell 102 may not completely extend around the core 104. For example, with reference to FIGS. 31 and 32, a portion of the core 104 may be wider than the interior cavity of the shell 102 and may extend to be parallel to, for instance, edges of the shell 102. As described, the shell 102 may have a generally uniform cross-sectional thickness.

In some embodiments, the pre-consolidated cellulosic mat can be formed in a wet process, e.g., where cellulosic fillers or fibers in a slurry having a high moisture content (e.g., about ninety percent (90%) water or more by weight) and a synthetic resin binder (e.g., phenol-formaldehyde resin) are deposited onto a water permeable support (e.g., a fine screen, mesh, wire, etc.). Moisture is then removed to leave a wet mat of cellulosic material having a lower moisture content (e.g., about fifty percent (50%) water by weight). The wet mat can then be molded under high temperature and pressure to form the composite material shell 102. In some embodiments, the pre-consolidated cellulosic mat can be formed in a wet-dry process, e.g., where a large amount of moisture from a wet mat is evaporated prior to molding (e.g., leaving the mat with a water content of about ten percent (10%) or less by weight). Further, a pre-consolidated cellulosic mat can be formed in a dry process, e.g., where cellulosic fibers are conveyed mechanically or in a gas stream rather than in a liquid. For example, cellulosic fibers may be coated with thermosetting resin binder (e.g., phenol-formaldehyde resin) and formed into a mat by blowing the coated fibers onto a support.

In some embodiments, the shell 102 may be formed as a thin-layered wood composite including lignocellulose/lignocellulosic fiber and a polymer resin. The term lignocellulose refers to plant dry matter (biomass) including carbohydrate polymers (cellulose, hemicellulose) and an aromatic polymer (lignin). The lignocellulose composite mixture may have about 70% to about 99% by weight lignocellulosic fiber. The lignocellulosic fiber can have a range of moisture levels and may be dehydrated prior to treatment with the resin. For example, the lignocellulosic fiber can have from about 2% to about 20% moisture content by weight. In embodiments, the resin may be a formaldehyde-based resin, an isocyanate-based resin, and/or another thermoplastic or thermoset resin. In some embodiments, the amount of resin may range from about 1% to about 25% by weight of the composite. The lignocellulosic composite mixture may also include one or more waxes (e.g., a natural wax and/or a synthetic wax, such as paraffin wax, polyethylene wax, polyoxyethylene wax, microcrystalline wax, shellac wax, ozokerite wax, montan wax, emulsified wax, slack wax, etc.). The thin-layer composites may also include a pre-press sealer (e.g., a liquid material applied to the surface of a mat used to formulate the thin-layer composite prior to the mat entering a press). The lignocellulosic mixtures may be pressed into a thin-layer using flat or molded dies at high temperature and/or pressure. The mixture may initially be formed into a loose mat then placed into a die press.

Figure 33:
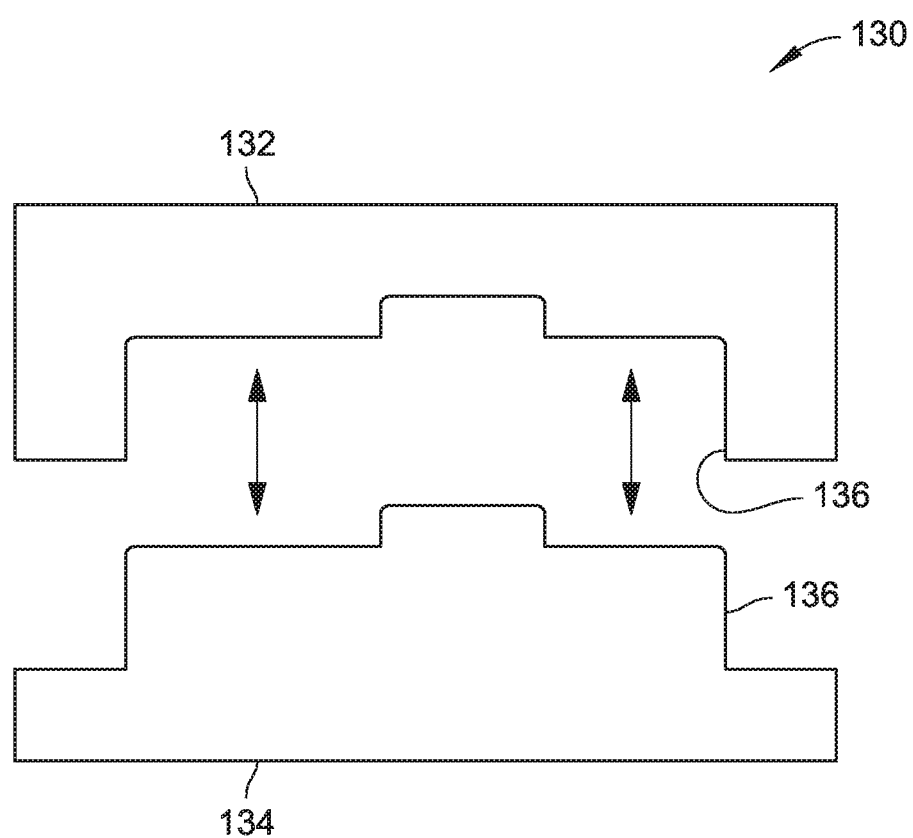
FIG. 33 is a diagrammatic illustration of a two-part mold for forming an outer one-piece shell for an interior door jamb assembly of a door jamb set, such as the door jamb set illustrated in FIG. 3, in accordance with example embodiments of the present disclosure.

With reference to FIG. 33, a two-part mold, such as a die press 130 (e.g., having a first die 132 and a second die 134) may be used to form the shell 102. For example, a pre-consolidated mat can be placed into the die press 130 and formed into consolidated medium-density fiberboard (MDF), hardboard, softboard, low-density fiberboard, and so forth. As described, hardwood and/or softwood residuals broken down into fillers or fibers can be formed into a loose mat along with a binding agent and/or resin and/or wax and compressed under high temperature and pressure in the die press 130 to form the shell 102. In some embodiments, one or more walls 136 of the first die 132 and/or the second die 134 may be formed with a negative camber or positive draft (e.g., for more easily releasing from the die press 130). For example, walls 136 of the first die 132 and/or the second die 134 may slope outwardly and downwardly when viewed from an end, allowing the shell 102 to more easily release from the dies after formation. In some embodiments, one or more walls 136 of the first die 132 and/or the second die 134 may be formed with a zero camber or zero draft (e.g., at an angle of about ninety (90) degrees from an adjacent surface, as described with reference to FIGS. 34 and 35). In some embodiments, one or more walls 136 of the first die 132 and/or the second die 134 may be formed with a positive camber or negative draft. For example, walls 136 of the first die 132 and/or the second die 134 may slope inwardly and downwardly when viewed from an end, providing a back bevel.

Figure 16:
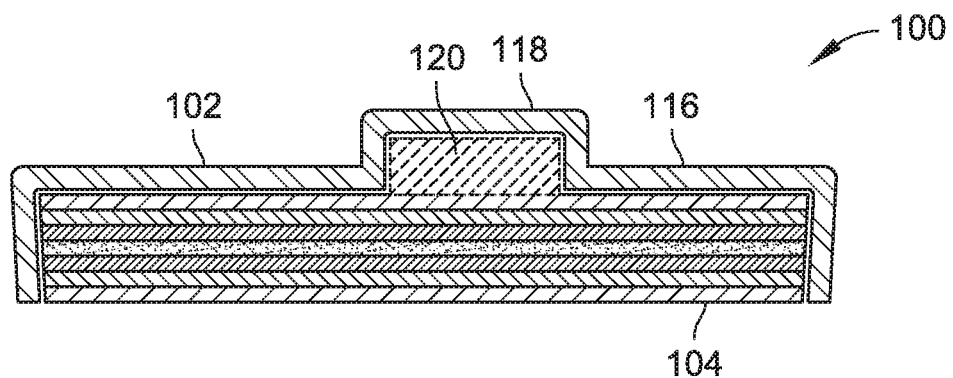
FIG. 16 is a cross-sectional end view illustrating an interior door jamb assembly for a door jamb set, such as the door jamb set illustrated in FIG. 3, in accordance with example embodiments of the present disclosure.
Figure 17:
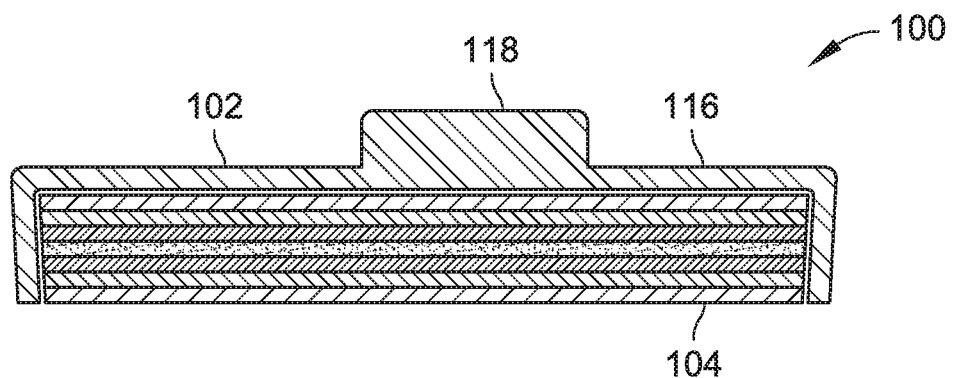
FIG. 17 is another cross-sectional end view illustrating an interior door jamb assembly for a door jamb set, such as the door jamb set illustrated in FIG. 3, in accordance with example embodiments of the present disclosure.
Figure 18:
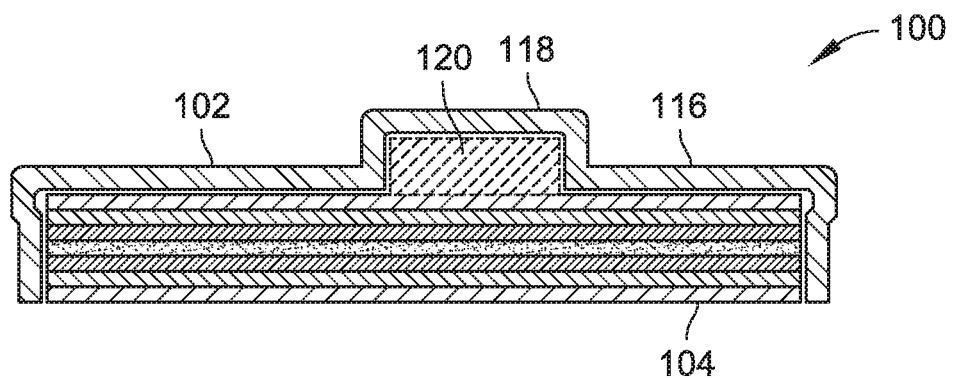
FIG. 18 is a further cross-sectional end view illustrating an interior door jamb assembly for a door jamb set, such as the door jamb set illustrated in FIG. 3, in accordance with example embodiments of the present disclosure.
Figure 19:
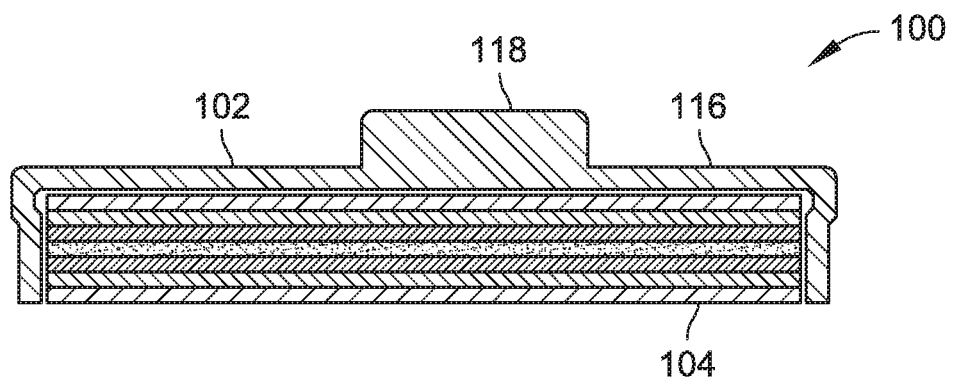
FIG. 19 is a cross-sectional end view illustrating an interior door jamb assembly for a door jamb set, such as the door jamb set illustrated in FIG. 3, in accordance with example embodiments of the present disclosure.
Figure 20:
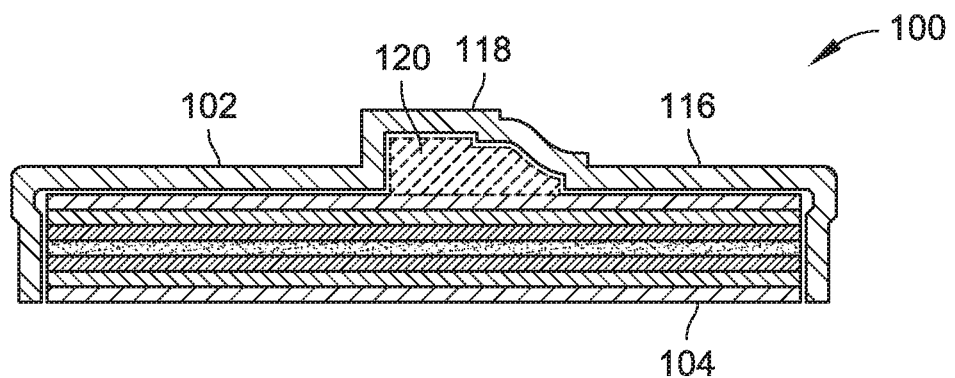
FIG. 20 is another cross-sectional end view illustrating an interior door jamb assembly for a door jamb set, such as the door jamb set illustrated in FIG. 3, in accordance with example embodiments of the present disclosure.
Figure 21:
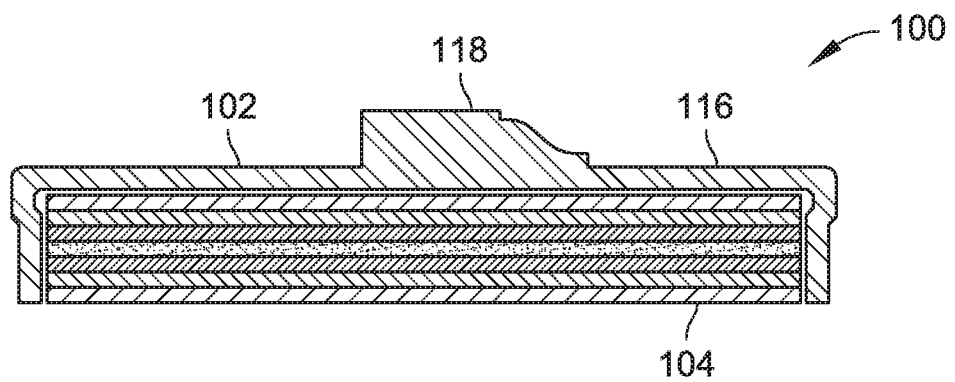
FIG. 21 is a further cross-sectional end view illustrating an interior door jamb assembly for a door jamb set, such as the door jamb set illustrated in FIG. 3, in accordance with example embodiments of the present disclosure.
Figure 22:
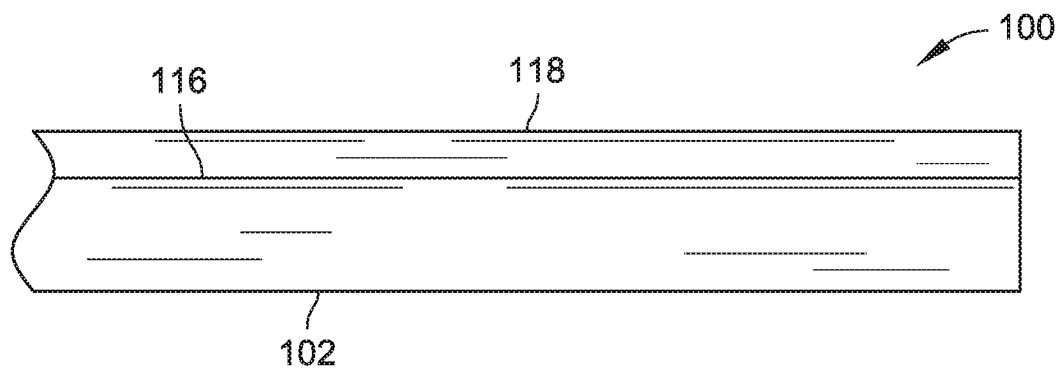
FIG. 22 is a partial side view illustrating an interior door jamb assembly for a door jamb set, such as the door jamb set illustrated in FIG. 3, in accordance with example embodiments of the present disclosure.
Figure 23:
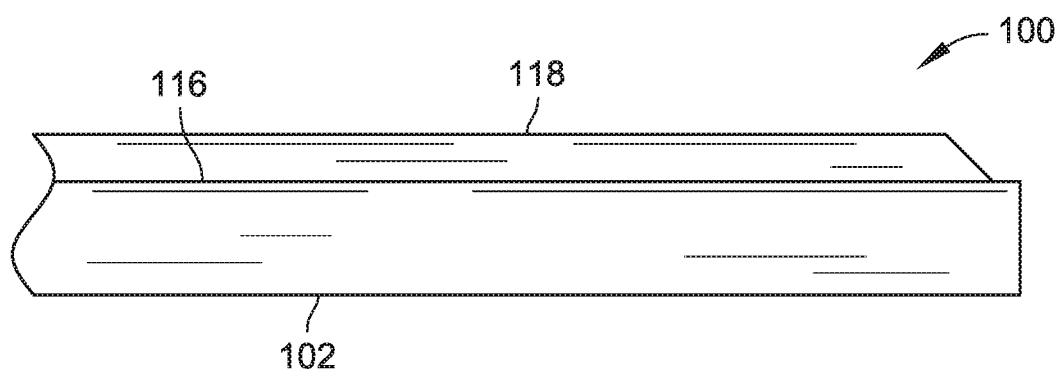
FIG. 23 is another partial side view illustrating an interior door jamb assembly for a door jamb set, such as the door jamb set illustrated in FIG. 3, in accordance with example embodiments of the present disclosure.
Figure 24:
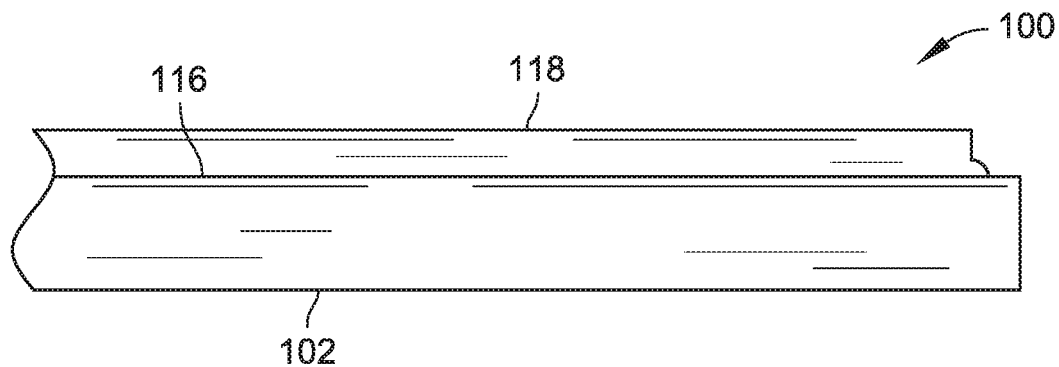
FIG. 24 is a further partial side view illustrating an interior door jamb assembly for a door jamb set, such as the door jamb set illustrated in FIG. 3, in accordance with example embodiments of the present disclosure.
Figure 25:
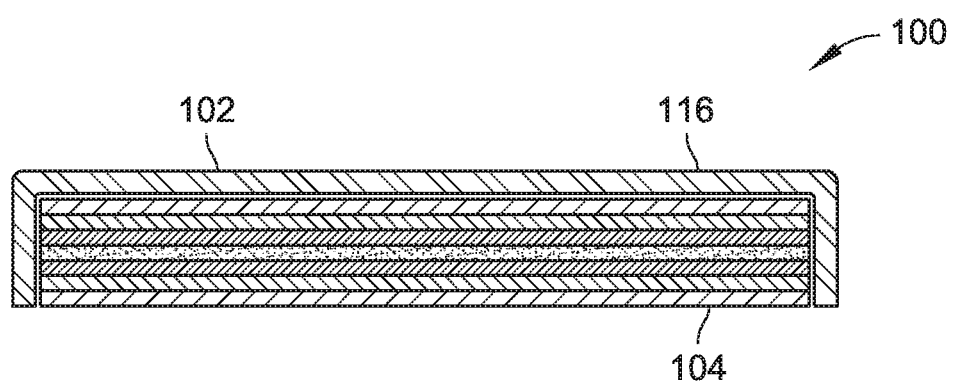
FIG. 25 is a cross-sectional end view illustrating an interior door jamb assembly for a door jamb set, such as the door jamb set illustrated in FIG. 3, in accordance with example embodiments of the present disclosure.
Figure 26:
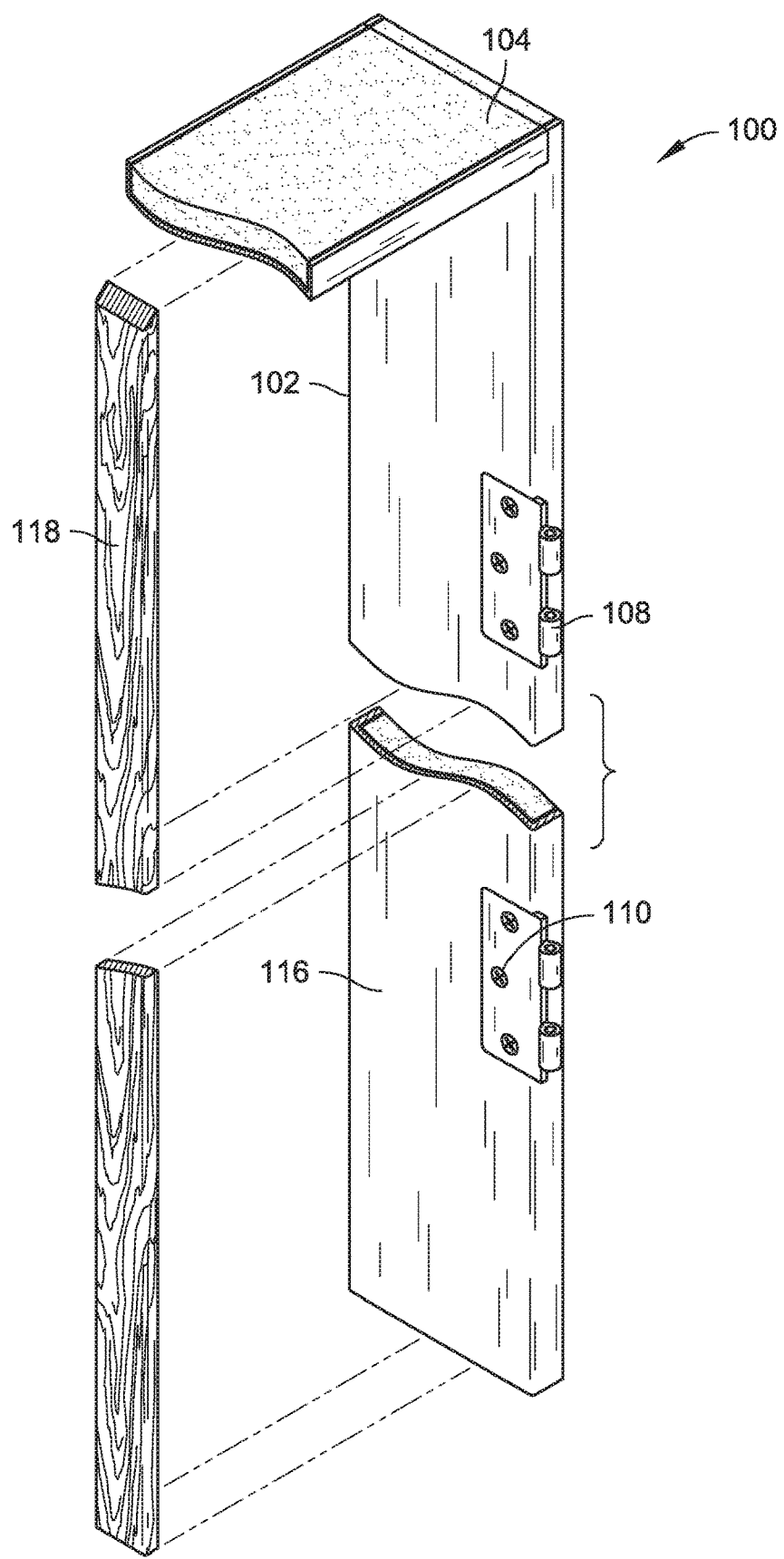
FIG. 26 is a partial isometric view illustrating interior door jamb assemblies and hinges for a door jamb set, such as the door jamb set illustrated in FIG. 3, in accordance with example embodiments of the present disclosure.
Figure 27:
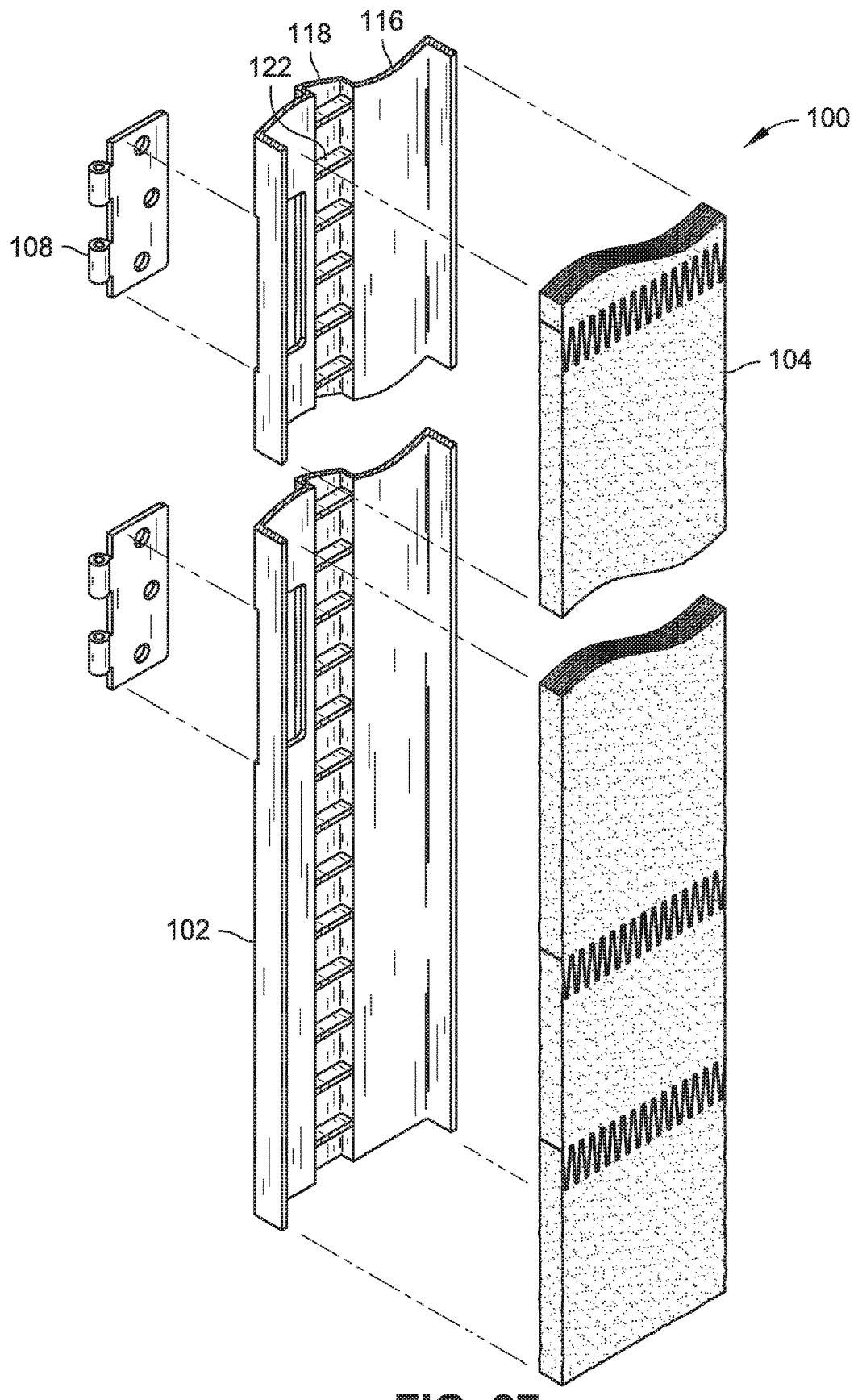
FIG. 27 is a partial exploded isometric view illustrating an interior door jamb assembly and hinges for a door jamb set, such as the door jamb set illustrated in FIG. 3, in accordance with example embodiments of the present disclosure.
Figure 28:
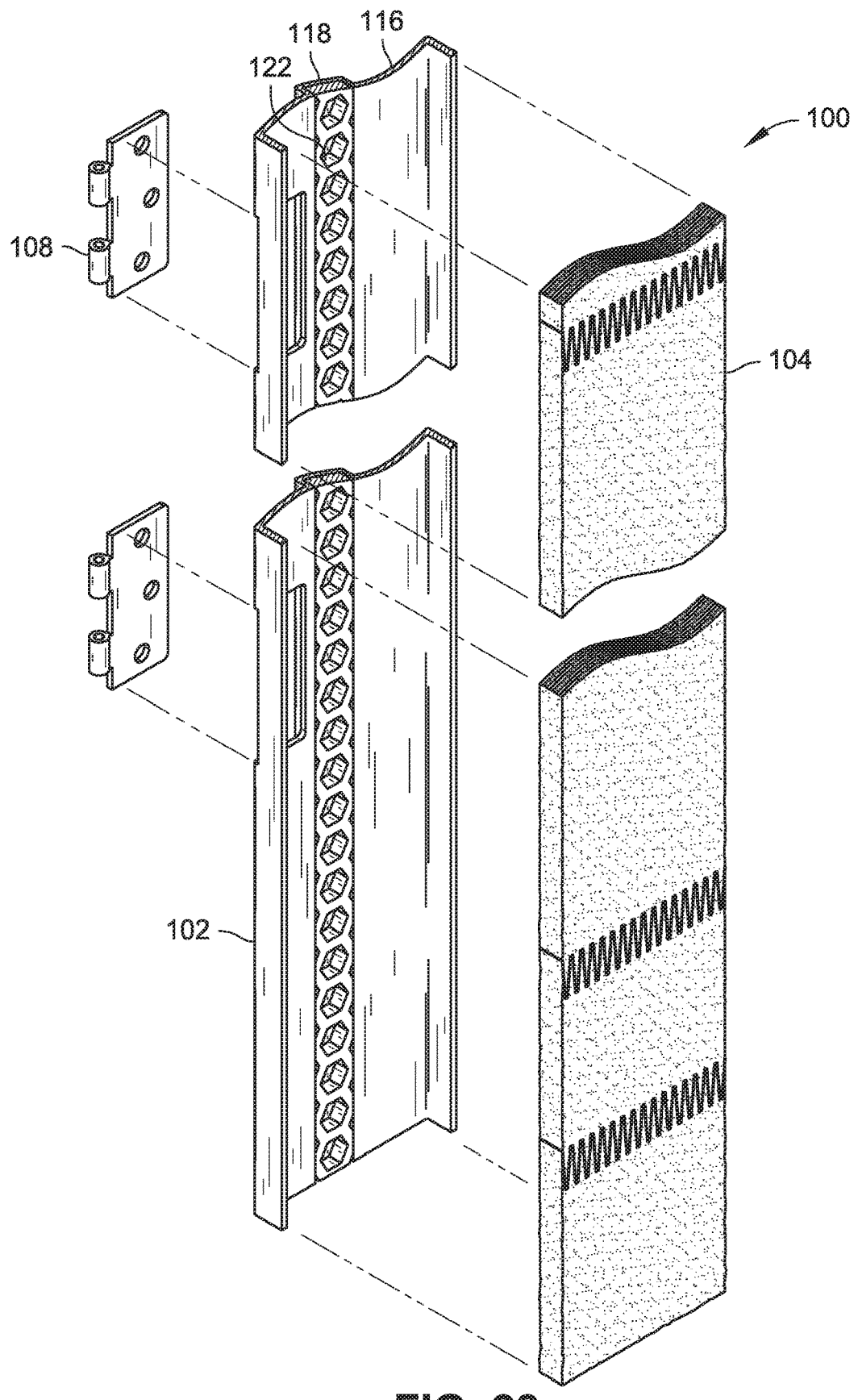
FIG. 28 is another partial exploded isometric view illustrating an interior door jamb assembly and hinges for a door jamb set, such as the door jamb set illustrated in FIG. 3, in accordance with example embodiments of the present disclosure.
Figure 29:
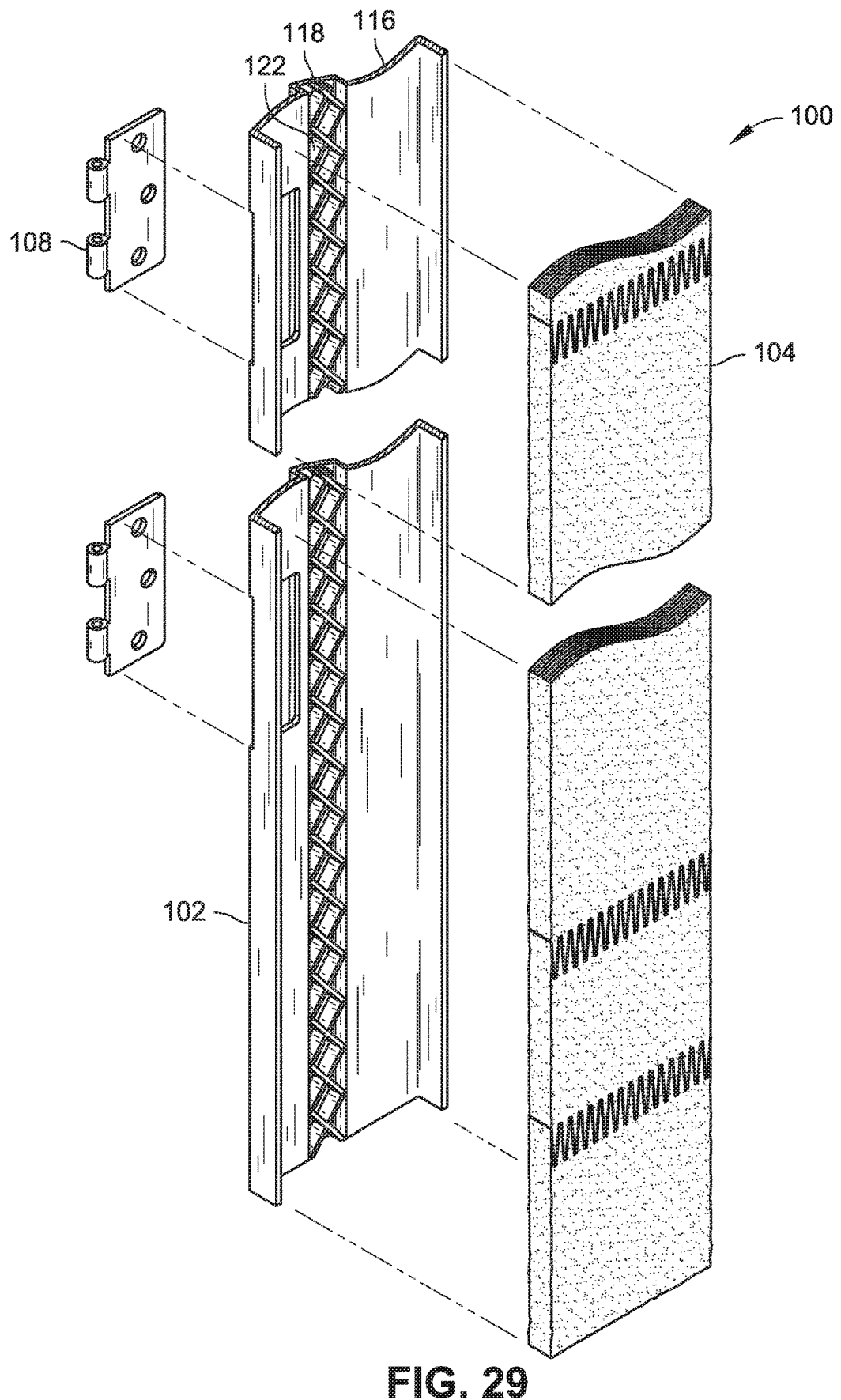
FIG. 29 is a further partial exploded isometric view illustrating an interior door jamb assembly and hinges for a door jamb set, such as the door jamb set illustrated in FIG. 3, in accordance with example embodiments of the present disclosure.
Figure 30:
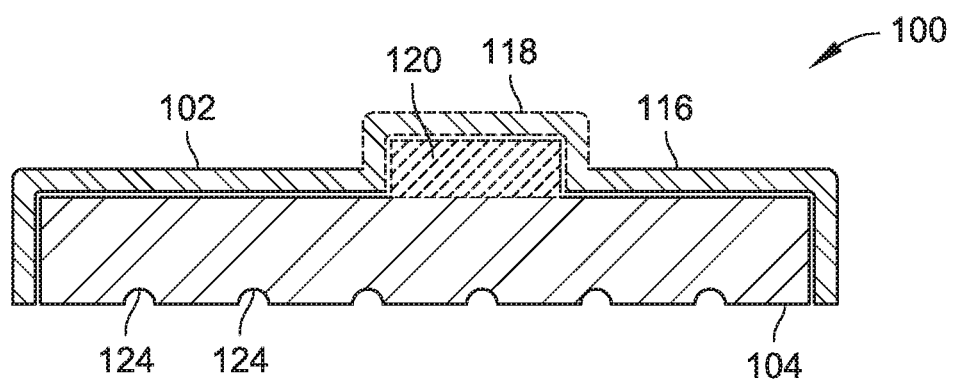
FIG. 30 is a cross-sectional end view illustrating an interior door jamb assembly for a door jamb set, such as the door jamb set illustrated in FIG. 3, in accordance with example embodiments of the present disclosure.
Figure 31:
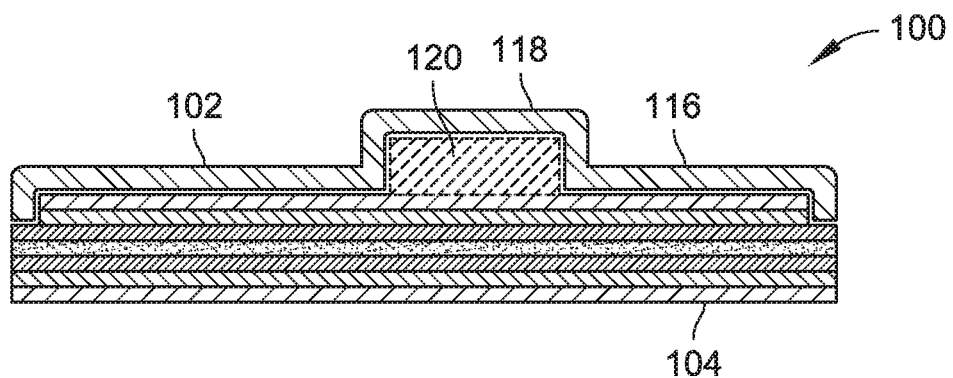
FIG. 31 is a cross-sectional end view illustrating an interior door jamb assembly for a door jamb set, such as the door jamb set illustrated in FIG. 3, in accordance with example embodiments of the present disclosure.
Figure 32:
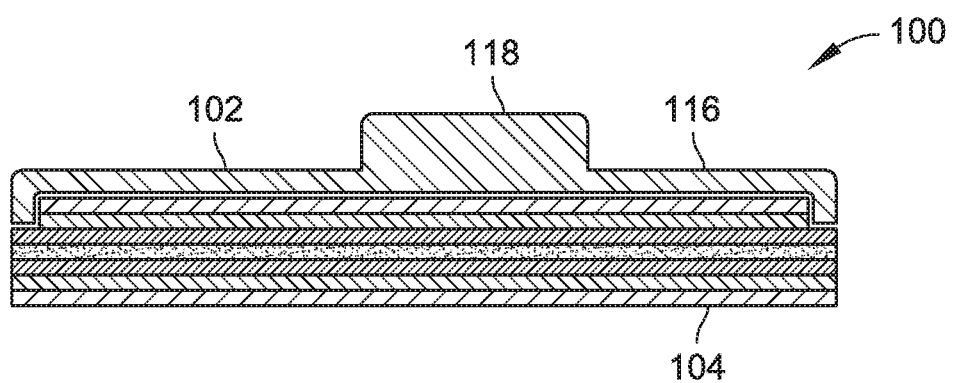
FIG. 32 is another cross-sectional end view illustrating an interior door jamb assembly for a door jamb set, such as the door jamb set illustrated in FIG. 3, in accordance with example embodiments of the present disclosure.
Figure 34:
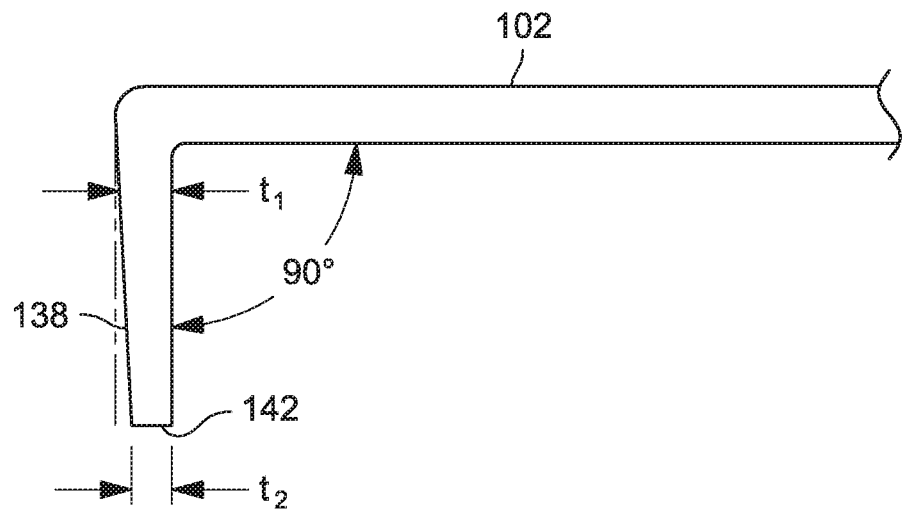
FIG. 34 is a partial end view illustrating an outer one-piece shell formed using a two-part mold, such as the mold illustrated in FIG. 33, where an end of the shell has been trimmed to form a back bevel in accordance with example embodiments of the present disclosure.
Figure 35:
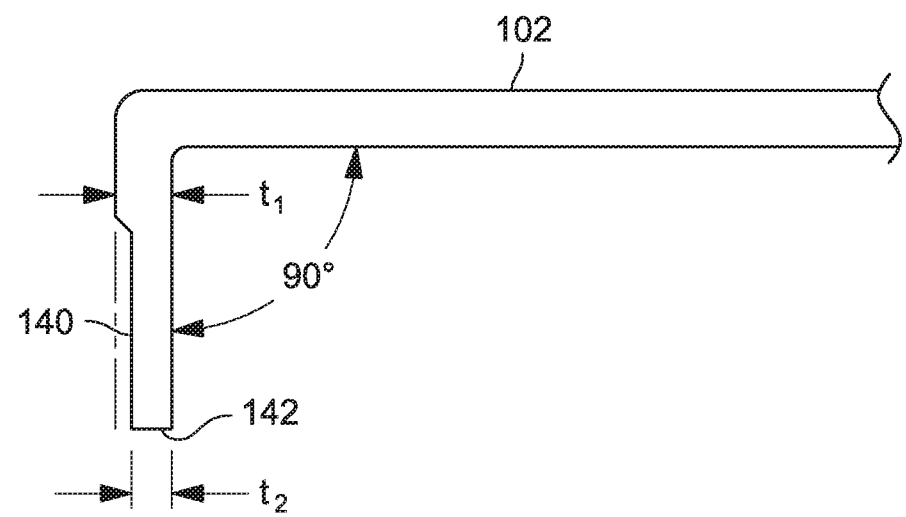
FIG. 35 is a partial end view illustrating an outer one-piece shell formed using a two-part mold, such as the mold illustrated in FIG. 33, where an end of the shell has been trimmed to form a trim guide detail in accordance with example embodiments of the present disclosure.

Referring to FIGS. 34 and 35, in an example configuration where, for instance, walls 136 of the first die 132 and/or the second die 134 are formed with a negative camber or positive draft and/or with a zero camber or zero draft, a back bevel (FIG. 34) and/or trim guide (FIG. 35) feature may be provided by a trimming or machining operation. For example, a back bevel 138 and/or a trim guide 140 may be provided by cutting, shaving, milling, or otherwise trimming material from the shell 102 to thin the shell from a first thickness $t_1$ to a second thickness $t_2$. However, a trimming or machining operation is provided by way of example and is not meant to limit the present disclosure. In other embodiments, a die (e.g., first die 132 and/or second die 134) may include a movable segment configured to form a feature that provides positive camber or negative draft. In this configuration, the movable segment may be positioned to create a feature with positive camber or negative draft (e.g., the back bevels shown on the shells 102 as illustrated in FIGS. 16 and 17 and/or the notches shown on the interior of the shells 102 as illustrated in FIGS. 18 and 19). The movable segment may then be moved out of position to allow the shell 102 to release form the die press 130 and the dies 132 and/or 134. It should also be noted that the ends 142 of a shell formed from a pre-consolidated cellulosic mat may be rough after manufacturing, and the ends 142 may be trimmed (e.g., machined, milled) after the shell 102 has been formed in the die press 130.

However, a pre-consolidated cellulosic mat is provided by way of example and is not meant to limit the present disclosure. In other embodiments, a pre-formed planar fiber board may also be molded to form a composite material shell 102. For instance, an MDF board may be heat treated to its softening point and then deformed in a press. In some embodiments, a shell 102 may also be corrugated (e.g., in the manner of cardboard). When the shell 102 is formed (e.g., using a wet process, a wet-dry process, a dry process, a fiber board process, or another process), various surface features and/or contours can be formed in the shell 102 using various mold or press features. For example, a shell 102 having a thickness of about one-eighth of an inch (⅛") can be formed and textured using a mold or press with a complementary relief pattern that forms a wood grain pattern on one or more surfaces of the shell 102. Additionally, a shell 102 can be formed of more than one molded or pressed composite material segment joined together (e.g., using an adhesive binder or another adhesive at contact points along mating surfaces of the shell segments). Further, in some embodiments, a shell 102 can be formed using another process, such as extrusion. For example, the shell 102 may be formed using one or more extruded plastic materials, vinyl materials, polyvinyl chloride (PVC) materials, fiber glass materials, and so forth. In a similar manner to a molded material that forms a composite shell 102, various surface features and/or contours may be formed in an extruded shell 102 (e.g., using various mold and/or press features).

Once the shell 102 has been formed under high temperature and pressure, a number of different surface finishes and/or treatments may be applied to the shell 102. For example, one or more layers of primer, paint, and/or stain can be applied to the surface of the shell 102. An interior door jamb assembly 100 may be sold as a primed and ready-to-paint unit. In some embodiments, a veneer, such as a wood veneer, may also be applied to one or more surfaces of the shell 102. The shell 102 may be glued (e.g., using an adhesive binder or another adhesive) to the core 104.

The core 104 can be formed of a wood material (e.g., scrap wood), a composite material (e.g., particle board (PB), MDF, plywood, laminated veneer lumber (LVL), wafer board, finger-jointed wood, and so forth) having a generally rectangular cross-sectional area. For example, the core 104 can be cut to fit and then glued in behind the shell 102. It should be noted that because the cavity of the outer shell 102 hides the inner core 104, the core 104 may be rough and/or unfinished (e.g., not finely milled). For instance, the core 104 can be formed from edge glued blocks, finger jointed blocks (e.g., as described with reference to FIGS. 5 and 6), and so forth. In some embodiments, the core 104 can be made of particle board and/or MDF (e.g., as described with reference to FIG. 7). In some embodiments, the core 104 can be made of a laminated lumber, such as plywood (e.g., as described with reference to FIGS. 10-21). Further, in some embodiments, reinforcing blocks of a different material (e.g., milled lumber) can be positioned proximate to key areas of the jamb 116 (e.g., behind the hinges 108 as described with reference to FIG. 6). For example, MDF may have better screw holding ability compared to, for example, particle board, and MDF may be used behind hinges 108 while particle board or another less expensive material is used for the remainder of the core 104. In another example, plywood, LVL, or wafer board may have better screw holding ability and/or moisture resistance compared to particle board and MDF, and one or more of these materials (e.g., plywood, LVL, wafer board) may be used behind hinges 108 while particle board, MDF, and/or another less expensive material is used for the remainder of the core 104. LVL, finger-jointed wood and/or other materials that exhibit dimensional stability may also be desirable for strategic positioning along the core 104.

The techniques and apparatus of the present disclosure may provide for improved raw material utilization. For example, wood residuals, particle board, and/or MDF segments used for the inner core 104 may be milled from smaller sections of wood into the shape of the cavity in the outer shell 102 (e.g., as opposed to typical door jambs and stops, which are milled from larger sections of wood). Further, in embodiments where the inner core 104 has a generally rectangular cross-sectional profile, the core 104 may be cut from a standard thickness flat panel by sawing rather than by milling larger wood sections using, for instance, a molder. It should also be noted that forming the outer shell 102 from a slurry and/or a pressed panel may save approximately twenty percent (20%) in material (e.g., in comparison to milling the jambs and stops from larger sections of wood).

The outer shell 102 can be made from wood fiber and can include small trees that would otherwise be too small to process into typical jambs and stops, as well as including branches, knots, and small and/or short wood scraps. Further, the composite shell 102 can be made from tree species not typically used in the manufacturing of door jambs (e.g., due to stability issues, size, abundance, and/or other factors). Additionally, it is noted that typical door stops are nailed or stapled into the face of a door jamb through the face of the stop. The holes are then filled prior to finishing (e.g., painting) the door jamb. However, in accordance with the present disclosure, there are not necessarily holes through the stop 118 that are filled. Further, as opposed to door jambs with a stop nailed to the jamb, there is also not a gap or a seam between the jamb 116 and the stop 118, which would otherwise be caulked prior to finishing (e.g., painting) the jamb. However, a door jamb assembly 100 with a seamless stop 118 is provided by way of example and is not meant to limit the present disclosure. In some embodiments, a door jamb assembly 100 may be formed with a flat jamb 116, and an additional stop 118 may be nailed onto the jamb 116 (e.g., as described with reference to FIGS. 25 and 26).

It should also be noted that the surface of a molded door jamb assembly 100 can be matched to the surface of, for example, a molded 6-panel door (e.g., having an MDF exterior). For instance, a door jamb assembly 100 can have a primer coat applied, which may be similar or comparable to the door mating to the door jamb assembly 100. The door jamb assembly 100 can also have a surface texture 126, such as an embossed wood grain pattern (e.g., as described with reference to FIG. 8) or another surface texture 126 (e.g., as described with reference to FIG. 9), similar to or comparable to the door mating to the door jamb assembly 100. Additionally, wood product defects in the exterior of the door jamb assembly 100, such as splits, tear outs, knots, pitch bleeds, resin bleeds, and the like may be reduced or eliminated using the systems, techniques, and apparatus disclosed herein. Furthermore, the incidence of typical wood distortion found in existing wood products, e.g., cupping, warping, twisting, crooking, and so forth, may be reduced or eliminated, e.g., due to the shape of the composite outer shell 102, which can stabilize the inner core 104. Further, in some embodiments, a core 104 may include structural features configured to further strengthen a door jamb assembly 100 and/or reduce or minimize dimensional distortion/cupping. For example, one or more features, such as longitudinal channels and/or grooves 124 may be formed in the core 104 (e.g., on a back side of the core as described with reference to FIG. 30). In some embodiments, the grooves 124 may run the length of the core 104.

Additionally, improved utilization of wood and/or reduction of material waste of wood over typical manufacturing may be achieved using the systems, techniques, and apparatus disclosed herein. Also, areas with an abundant wood fiber supply but a lesser supply of larger sections of wood for milling one-piece jamb parts can benefit from the ability to locally manufacture the door jamb assemblies 100 disclosed herein, incurring, for example, reduced shipping costs due to domestic production. It should also be noted that the defect rate may be reduced (e.g., in comparison to milling wood components) as described herein.

Figure 12:
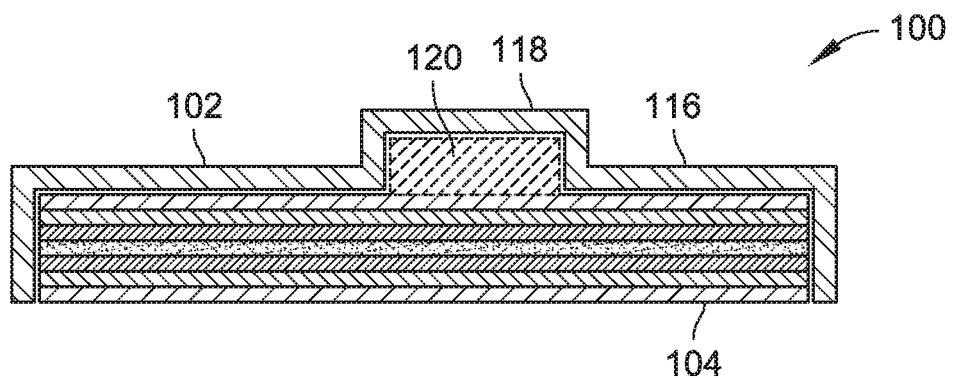
FIG. 12 is a further cross-sectional end view illustrating an interior door jamb assembly for a door jamb set, such as the door jamb set illustrated in FIG. 3, in accordance with example embodiments of the present disclosure.
Figure 13:
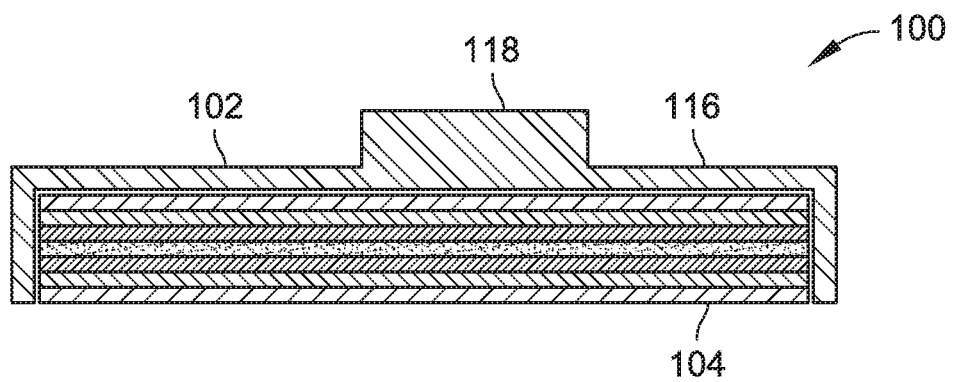
FIG. 13 is a cross-sectional end view illustrating an interior door jamb assembly for a door jamb set, such as the door jamb set illustrated in FIG. 3, in accordance with example embodiments of the present disclosure.
Figure 14:
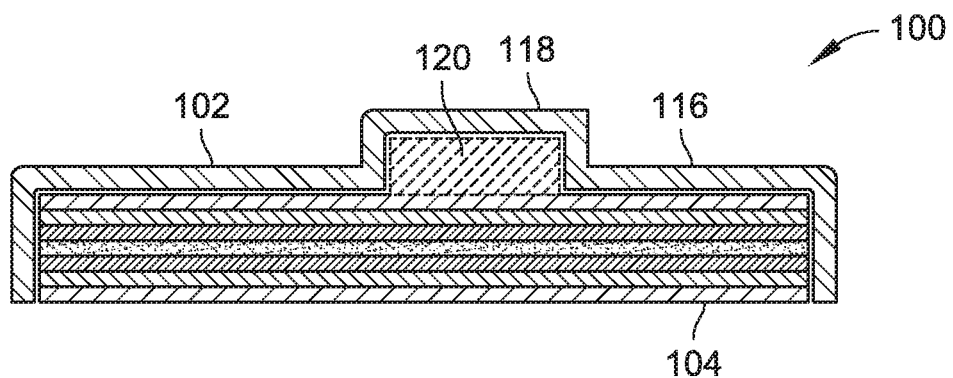
FIG. 14 is another cross-sectional end view illustrating an interior door jamb assembly for a door jamb set, such as the door jamb set illustrated in FIG. 3, in accordance with example embodiments of the present disclosure.
Figure 15:
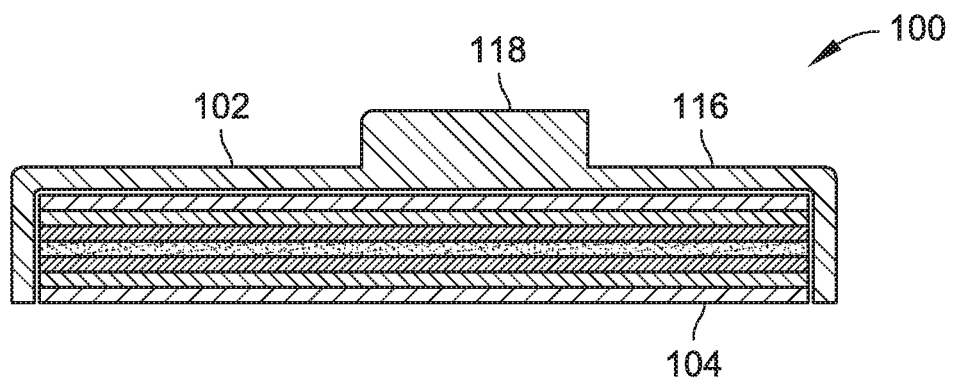
FIG. 15 is a further cross-sectional end view illustrating an interior door jamb assembly for a door jamb set, such as the door jamb set illustrated in FIG. 3, in accordance with example embodiments of the present disclosure.

In some embodiments, the edges and/or sides of a door jamb assembly 100 may be back beveled (e.g., as described with reference to FIGS. 16 and 17 and 34), square (e.g., as described with reference to FIGS. 12 and 13), trim guide (e.g., as described with reference to FIGS. 18 through 21 and 35), and so forth. Further, the width of a door jamb assembly 100 can vary based upon, for instance, door opening size, wall thickness, and so forth. The shape of the stop 118 may also vary. For example, with reference to FIGS. 20 and 21, the stop 118 may be colonial shaped. With reference to FIGS. 12 and 13, the stop 118 may also have square edges. However, these shapes are provided by way of example and are not meant to limit the present disclosure. In other embodiments, a stop 118 may have a different shape, including, but not necessarily limited to: a one-radius edge (e.g., as described with reference to FIGS. 14 and 15), a two-radius edge (e.g., as described with reference to FIGS. 10 and 11), and so forth. The width and/or height of a stop 118 may also vary. Further, the door jamb assembly 100 may have different end work, including, but not necessarily limited to: a straight cut (e.g., as described with reference to FIG. 22), a miter cut (e.g., as described with reference to FIG. 23), a coped end cut (e.g., as described with reference to FIG. 24), and so forth.

In some embodiments, the thickness of the outer shell 102 can be at least approximately the thickness of a hinge 108. During assembly (e.g., of a door jamb set), the shell 102 can be routed through to expose the inner core 104, and the hinge 108 can be attached to the door jamb using fasteners (e.g., screws 110) connected to the inner core 104. However, routing through a door jamb assembly 100 during assembly is provided by way of example and is not meant to limit the present disclosure. In other embodiments, a door jamb assembly 100 may be machined/finished (e.g., for hinges 108) prior to sale and/or assembly as a door jamb set. The door jamb set formed of the door jamb assemblies 100 can include the door 106, and the pre-hung door can be attached to the door opening by fastening (e.g., nailing or screwing) through the flat of the jamb, i.e., through the outer shell 102, through the inner core 104, and into the door rough opening.

In some embodiments, the stop 118 can be hollow (e.g., as described with reference to FIGS. 10, 12, 14, 16, 18, and 20). The interior cavity of the hollow stop 118 can be left empty, or, in some embodiments, a protrusion 120 of the core 104 can extend into the cavity of the stop 118 (e.g., again as described optionally with reference to FIGS. 10, 12, 14, 16, 18, and 20). For example, an additional piece of wood, additional wood fragments, or another material can be glued or otherwise fastened to the rough and/or unfinished (e.g., not finely milled) edge glued blocks, finger jointed blocks, particle board, and/or MDF forming the core 104. Such additional wood or other material disposed in the cavity of the stop 118 may form, for example, a door stop core. However, in other embodiments, the stop 118 may be solid (e.g., as described with reference to FIGS. 11, 13, 15, 17, 19, and 21). For example, when the shell 102 is molded from slurry and/or pressed from a flat composite panel, the stop 118 can be formed from a portion of the slurry and/or pressed panel which is less compressed than the remainder of the shell 102. In some embodiments, the stop 118 can be formed from a loose mat and binding agent/resin/wax arrangement, where the raw material mat thickness is increased in the area of the stop 118. Further, in some embodiments, the stop 118 can include interior strengthening/stabilizing features 122, including, but not necessarily limited to: latticing, honeycombing, cross-bracing, and so forth (e.g., as described with reference to FIGS. 27 through 29). These features 122 may also be formed of slurry or panel material that is less compressed than the remainder of the shell 102. Further, such features 122 may be formed of separate material glued or otherwise attached to the shell 102. In some embodiments, the interior of the stop 118 may also be corrugated (e.g., in the manner of cardboard).

While the description herein has detailed door jamb assemblies 100 including jambs 116 and stops 118 for interior doorway applications with some specificity, it is noted that these particular trim molding applications are provided by way of example and are not meant to limit the present disclosure. In other embodiments, the systems, techniques, and apparatus described herein can be used for various other interior trim molding applications, including, but not necessarily limited to, interior millwork applications that can use a molded outer surface shell with a rough wood stiffener inside, such as base moldings, case moldings, crown moldings, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An interior door jamb composite trim molding assembly comprising:
   an engineered wood composite outer shell configured as a flat jamb having at least one hollow pressed or molded stop, the composite outer shell having a generally uniform cross-sectional thickness, wherein the composite outer shell includes wood fiber and resin binder pressed together to form wood based pressed fiber, the wood based pressed fiber having a wood fiber content of between at least about seventy percent (70%) and about ninety-nine percent (99%) by weight and a resin binder content of between at least about one percent (1%) and about twenty-five percent (25%) by weight, the wood fiber of the wood based pressed fiber having a moisture content of between about two percent (2%) and about twenty percent (20%) by weight; and
   a rough, unfinished core disposed within the composite outer shell for at least one of strengthening or stiffening the outer shell, the rough, unfinished core having a generally rectangular cross-sectional area.

2. The interior door jamb composite trim molding assembly as recited in claim 1, wherein the composite outer shell has at least one pressed or molded surface feature comprising a surface texture.

3. The interior door jamb composite trim molding assembly as recited in claim 1, wherein the rough, unfinished core comprises laminated lumber.

4. The interior door jamb composite trim molding assembly as recited in claim 1, wherein the rough, unfinished core comprises at least one of a plurality of segments fastened together, particle board, or fiberboard.

5. The door jamb composite trim molding assembly as recited in claim 1, where an end of the composite outer shell is thinned from a first thickness to a second thickness to provide at least one of a back bevel or a trim guide.

6. An interior composite trim molding assembly comprising:
   an engineered wood composite outer shell having at least one pressed or molded surface feature, the composite outer shell including a flat jamb, wherein the composite outer shell includes wood fiber and resin binder pressed together to form wood based pressed fiber, the wood based pressed fiber having a wood fiber content of between at least about seventy percent (70%) and about ninety-nine percent (99%) by weight and a resin binder content of between at least about one percent (1%) and about twenty-five percent (25%) by weight, the wood fiber of the wood based pressed fiber having a moisture content of between about two percent (2%) and about twenty percent (20%) by weight; and a rough, unfinished core disposed within the composite outer shell for at least one of strengthening or stiffening the outer shell.

7. The interior composite trim molding assembly as recited in claim 6, wherein the at least one pressed or molded surface feature includes a stop, and the rough, unfinished core comprises a protrusion into a cavity formed by the stop.

8. The interior composite trim molding assembly as recited in claim 6, wherein the at least one pressed or molded surface feature comprises a surface texture.

9. The interior composite trim molding assembly as recited in claim 6, wherein the core comprises at least one of a plurality of segments fastened together, particle board, or fiberboard.

10. A method comprising:

forming an engineered wood composite outer shell configured as a flat jamb having at least one hollow pressed or molded stop, the composite outer shell having a generally uniform cross-sectional thickness, wherein forming the composite outer shell comprises mixing wood fiber and resin binder together to form a mixture having a wood fiber content of between at least about seventy percent (70%) and about ninety-nine percent (99%) by weight and a resin binder content of between at least about one percent (1%) and about twenty-five percent (25%) by weight, and pressing the wood fiber and the resin binder together to form wood based pressed fiber, the wood fiber of the wood based pressed fiber having a moisture content of between about two percent (2%) and about twenty percent (20%) by weight;

forming a rough, unfinished core for at least one of strengthening or stiffening the outer shell, the rough, unfinished core having a generally rectangular cross-sectional area; and fastening the rough, unfinished core within the composite outer shell to form an interior door jamb composite trim molding assembly.

11. The method as recited in claim 10, wherein the composite outer shell has at least one pressed or molded surface feature comprising a surface texture.

12. The method as recited in claim 10, wherein the rough, unfinished core comprises laminated lumber.

13. The method as recited in claim 10, wherein forming the rough, unfinished core comprises at least one of fastening a plurality of segments together, cutting particle board, or cutting fiberboard.

14. The method as recited in claim 10, further comprising thinning an end of the composite outer shell from a first thickness to a second thickness to provide at least one of a back bevel or a trim guide.

\* \* \* \* \*